(12) United States Patent  (10) Patent No.: US 8,168,329 B2
Liaw et al.  (45) Date of Patent: May 1, 2012

(54) ELECTROCHEMICAL COMPOSITION AND ASSOCIATED TECHNOLOGY

(75) Inventors: Ben-Jie Liaw, Taoyuan (TW); Wen-Ren Liu, Bade (TW); Sheng-Shih Chang, Taipei (TW)

(73) Assignee: Advanced Lithium Electrochemistry Co., Ltd., Taoyuan (TW)

( * ) Notice: Subject to any disclaimer, the term of this patent is extended or adjusted under 35 U.S.C. 154(b) by 779 days.

(21) Appl. No.: 12/265,529

(22) Filed: Nov. 5, 2008

(65) Prior Publication Data

US 2009/0081549 A1 Mar. 26, 2009

Related U.S. Application Data

(63) Continuation-in-part of application No. 11/940,276, filed on Nov. 14, 2007, now abandoned, which is a continuation-in-part of application No. 11/764,629, filed on Jun. 18, 2007, now Pat. No. 7,824,581.

(51) Int. Cl.
*H01M 4/131* (2010.01)
*H01M 4/1391* (2010.01)
*H01B 1/08* (2006.01)

(52) U.S. Cl. ............... 429/218.1; 252/182.1; 252/519.1; 252/519.12; 252/519.14; 252/519.15; 429/229

(58) Field of Classification Search .............. 423/306; 252/519.1, 519.12, 519.14, 519.15, 182.1; 429/218.1, 229
See application file for complete search history.

(56) References Cited

U.S. PATENT DOCUMENTS

| | | | |
|---|---|---|---|
| 5,871,866 | A | 2/1999 | Barker et al. |
| 5,910,382 | A | 6/1999 | Goodenough et al. |
| 6,085,015 | A | 7/2000 | Armand et al. |
| 6,203,946 | B1 | 3/2001 | Barker et al. |
| 6,514,640 | B1 | 2/2003 | Armand et al. |
| 6,632,566 | B1 | 10/2003 | Yamada et al. |
| 6,716,372 | B2 | 4/2004 | Barker et al. |

(Continued)

FOREIGN PATENT DOCUMENTS

JP 2003-323892 11/2003

OTHER PUBLICATIONS

Brochure, Advanced Lithium Electrochemistry Co., Ltd., Sep. 2007, 4 pages.

(Continued)

*Primary Examiner* — Wayne Langel
(74) *Attorney, Agent, or Firm* — Kirton McConkie; Evan R. Witt

(57) ABSTRACT

A composition for use in an electrochemical redox reaction is described. The composition may comprise a material represented by a general formula $M_yXO_4$ or $A_xM_yXO_4$, where each of A (where present), M, and X independently represents at least one element, O represents oxygen, and each of x (where present) and y represent a number, and an oxide of at least one of various elements, wherein the material and the oxide are cocrystalline, and/or wherein a volume of a crystalline structural unit of the composition may be different than a volume of a crystalline structural unit of the material alone. An electrode comprising such a composition is also described, as is an electrochemical cell comprising such an electrode. A process of preparing a composition for use in an electrochemical redox reaction is also described.

28 Claims, 14 Drawing Sheets

U.S. PATENT DOCUMENTS

| | | | |
|---|---|---|---|
| 6,815,122 | B2 | 11/2004 | Barker et al. |
| 6,884,544 | B2 | 4/2005 | Barker et al. |
| 7,001,690 | B2 | 2/2006 | Barker et al. |
| 7,026,072 | B2 | 4/2006 | Barker et al. |
| 7,087,346 | B2 | 8/2006 | Barker et al. |
| 7,326,494 | B2 | 2/2008 | Wang et al. |
| 7,700,236 | B2 * | 4/2010 | Yang .................... 429/218.1 |
| 7,781,100 | B2 * | 8/2010 | Liu et al. ............... 429/218.1 |
| 7,799,457 | B2 * | 9/2010 | Liu et al. ............... 429/218.1 |
| 7,901,810 | B2 * | 3/2011 | Barker et al. .......... 429/231.9 |
| 7,964,117 | B2 * | 6/2011 | Liaw et al. ............. 252/518.1 |
| 2003/0215715 | A1 | 11/2003 | Barker et al. |
| 2004/0005265 | A1 | 1/2004 | Chiang et al. |
| 2006/0246351 | A1 | 11/2006 | Barker et al. |
| 2006/0257307 | A1 | 11/2006 | Yang |
| 2007/0031732 | A1 | 2/2007 | Chiang et al. |
| 2007/0059598 | A1 | 3/2007 | Yang |
| 2007/0082267 | A1 | 4/2007 | Goodenough et al. |
| 2007/0141468 | A1 | 6/2007 | Barker |
| 2007/0207080 | A1 | 9/2007 | Yang |
| 2007/0207385 | A1 | 9/2007 | Liu |
| 2007/0238021 | A1 | 10/2007 | Liu |
| 2007/0264567 | A1 | 11/2007 | Yang |
| 2008/0138710 | A1 | 6/2008 | Liaw et al. |

OTHER PUBLICATIONS

Catti et al., "Extensive Lithium Disorder in $Li_{1.5}Fe_{0.5}Ti_{1.5}(PO_4)$ Nasicon by Neutron Diffraction, and the $Li_{1+x}Fe_xTi_{2-x}(PO_4)_3$ Phase Diagram," *Journal of Materials Chemistry*, 14, 2004, pp. 835-839.

Chen et al., "Studies of $LiCoO_2$ Coated with Metal Oxides," *Electrochemical and Solid-State Letters*, 6, (11), 2003, pp. A221-A224.

Chinese Patent Application No. 200610080365.5 filed on May 11, 2006, 20 pages.

Cho, "Zero-Strain Intercalation Cethod for Rechargeable Li-Ion Cell," *Angew.Chem. Int. Ed.*, 2001, 40, No. 18, pp. 3367-3369.

Davis, et al., "Studies of Phase Relationships in Cocrystal Systems," *American Crystallographic Association*, 2004, 39, pp. 41-61.

Deb et al., "Structural Investigations of $LiFePO_4$ Electrodes and In Situ Studies by Fe X-Ray Absorption Spectroscopy," *Electrochimicia Acta*, 50, 2005, pp. 5200-5207.

Eyob et al., "A Neutron Powder Diffraction Study of Electrochemically Lithiated $R-Li_{3+x}Fe_2(PO_4)_3$ for x=1.8," *Journal of Materials Chemistry*, 2002, 12, pp. 2343-2347.

Goldstone, et al., "Introduction to Atomic Emission Spectrometry," *ICP Optical Emission Spectroscopy*, Technical Note 12, pp. 1-6.

Hwang, et al., "$LiMn_2O_4$ Core Surrounded by $LiCo_xMn_{2-x}O_4$ Shell Material for Rechargeable Lithium Batteries," *Journal of Electrochemical Society*, 149, 6, 2002 pp. A694-A698.

Jayaprakash, et al., "On the Electrochemical Behavior of $LiM_xFe_{1-x}PO_4$ [PO4[M=Cu, Sn; X=0.02] Anodes—An Approach to Enhance the Anode Performance of $LiFePO_4$ Material," *Electrochemistry Communications*, 9, 2007, pp. 620-628.

Legagneur et al., "$LiMBO_3$ (M=Mn, Fe, Co): Synthesis, Crystal Structure and Lithium Deinsertion/Insertion Properties," *Solid State Ionics*, 139, 2001, pp. 37-46.

Letter to the Editor, "Chemical Oxidation of LiCoPO4," *Journal of Power Sources*, 183, 2004, pp. 281-282.

Liaw et al., "Synthesis and Electrochemical Property of Metal Oxide Cocrystalization on Nano-Olivine Particles," *Materials Laboratories, Advanced Lithium Electrochemistry Corporation*, presentation in Kyoto, Japan, Nov. 15, 2006, 1 page.

Liu, et al., "Doping Effects of Zinc on $LiFePO_4$ Cathode Material for Lithium Ion Batteries," *Electrochemistry Communications*, 8, 2006, pp. 1553-1557.

Mikhailov, "The Co-Crystallization of Beryl-Structure Compounds in the $Al_2Be_3Si_6O_{18}$-Mg,Ca/F, Cl System," *Journal of Crystal Growth*, 275, 2005, pp. e861-e866.

Ni et al., "$LiFePO_4$ with Ions Prepared by Co-Precipitation Method," *Materials Letters*, 59, 2005, pp. 2361-2365.

Nyten et al., "The Lithium Extraction/Insertion Mechanism in $Li_2FeSiO_4$," *Journal of Materials Chemistry*, 2006, 16, pp. 2266-2272.

Scherson et al., "Batteries and Electrochemical Capacitors," *The Electrochemical Society Interface*, Spring 2006, pp. 17-22.

Taiwanese Patent Application No. 094115023, filed on May 10, 2005, 27 pages.

Teng et al., "Electrochemical Properties of $LiFe_{0.9}Mg_{0.1}PO_4$/Carbon Cathode Materials Prepared by Ultrasonic Spray Pyrolysis," *Solid State Communications*, 142, 2007, pp. 389-392.

U.S. Appl. No. 11/764,629, filed Jun. 18, 2007, 25 pages.

U.S. Appl. No. 11/940,283, filed Nov. 14, 2007, 50 pages.

Wang et al., "Synthesis and Characterization of $LiFePO_4$ and $LiuTi_{0.01}Fe_{0.99}PO_4$ Cathode Materials," *Journal of Electrochemical Society*, 152, 1, 2006, pp. A25-A31.

Wang, et al., "Electrochemical Properties $TiP_2O_7$ and $LiTi_2(PO_4)_3$ as Anode Material for Lithium Ion Battery with Aqueous Solution Electrolyte," *Electrochimicia Acta* 52, 2007, pp. 3280-3285.

Wang, et al., "Improving the Rate Performance of $LiFePO_4$ by Fe-Site Doping," *Electrochimica Acta*, 50, 2005, pp. 2955-2958.

Wen et al., "Structure and Properties of $LiFe_{0.9}V_{0.1}PO_4$," *Journal of Alloys and Compounds*, 416, 2006, pp. 206-208.

Yin et al, "Charge Ordering in Lithium Vanadium Phosphates: Electrode Materials for Lithium-Ion Batteries," *Journal of American Chemical Society*, 2003, 125, p. 326-327.

Yu et al., "Properties and Structure of Sodium-Iron Phosphate Glasses," *Journal of Non-Crystalline Solids*, 215, 1997, pp. 21-31.

Zhou, et al., "The Li Intercalation Potential of $LiMPO_4$ and $LiMSiO_4$ Olivines with M=Fe, Mn, Co. Ni," *Electrochemistry Communications*, 6, 2004, pp. 1144-1148.

Liu et al., "The Novel Composite $LiFePO_4$/MO Composite Cathode Materials for Lithium Ion Batteries," *Advanced Lithium Electrochemistry Co.*, No. 2-1. Xinghua Road., Taoyuan City, Taoyuan County 330, Taiwan, Nov. 16, 2006, 1 page.

"Advanced Phosphate-Based Active Materials," *Valence Technology*, date unknown, pp. 1-4.

* cited by examiner

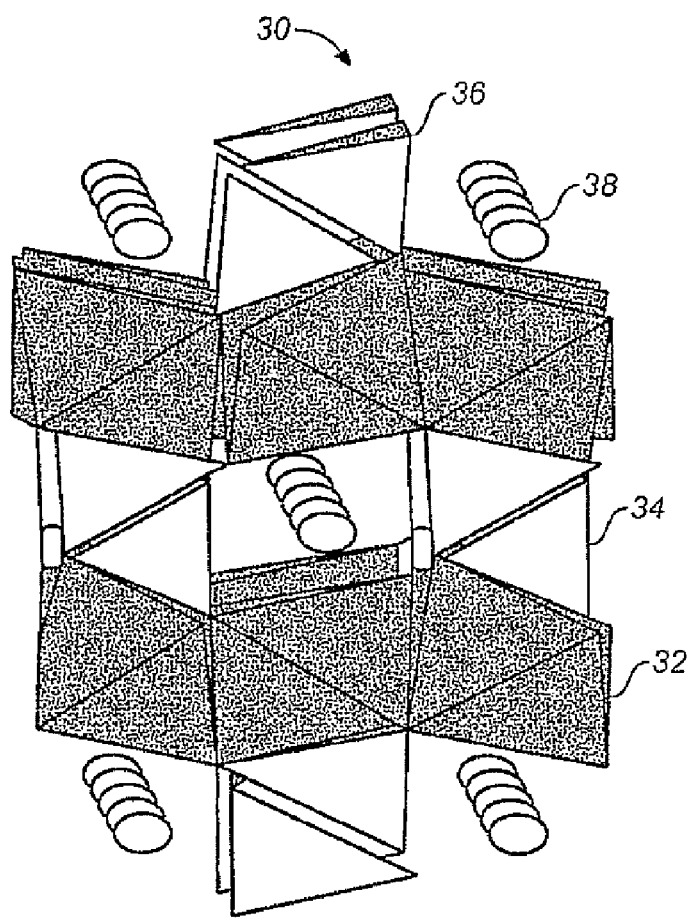
FIG. 3A
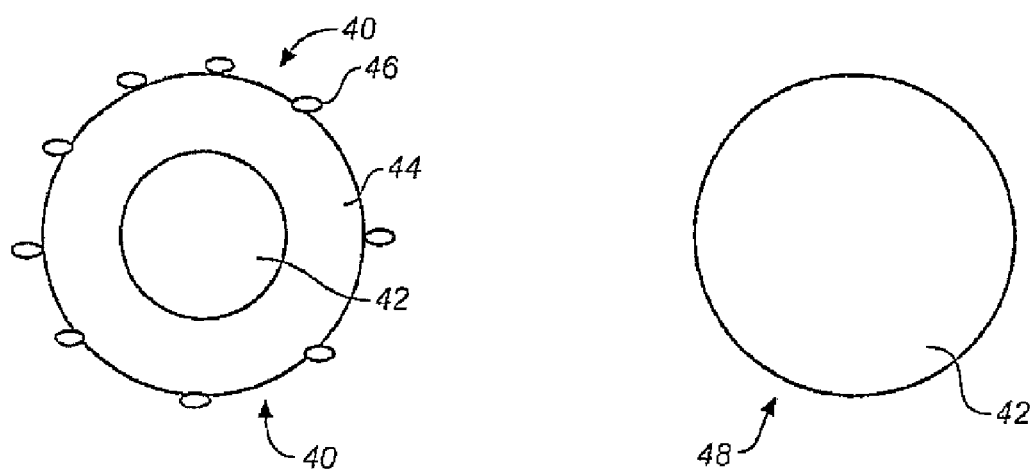
FIG. 3B  FIG. 3C

Original Name Cr_204
Magnification 0300K

Original Name Cu_09
Magnification 0600K

Original Name Ti_07
Magnification 0600K

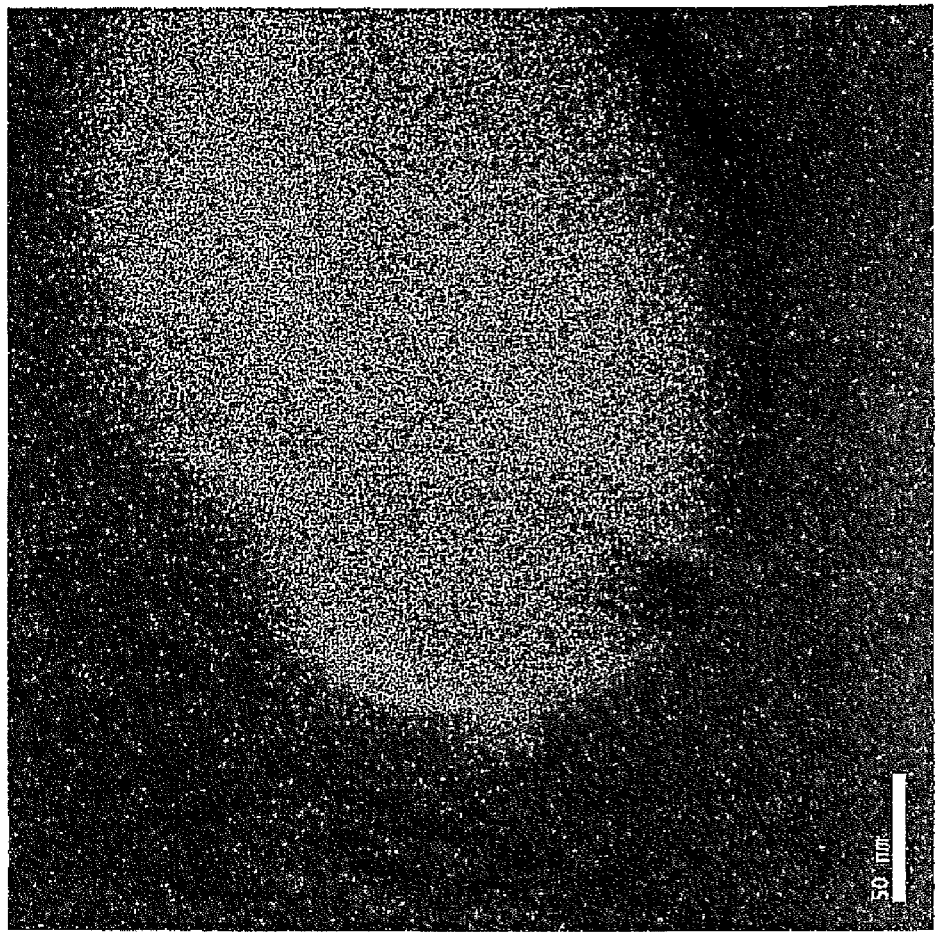

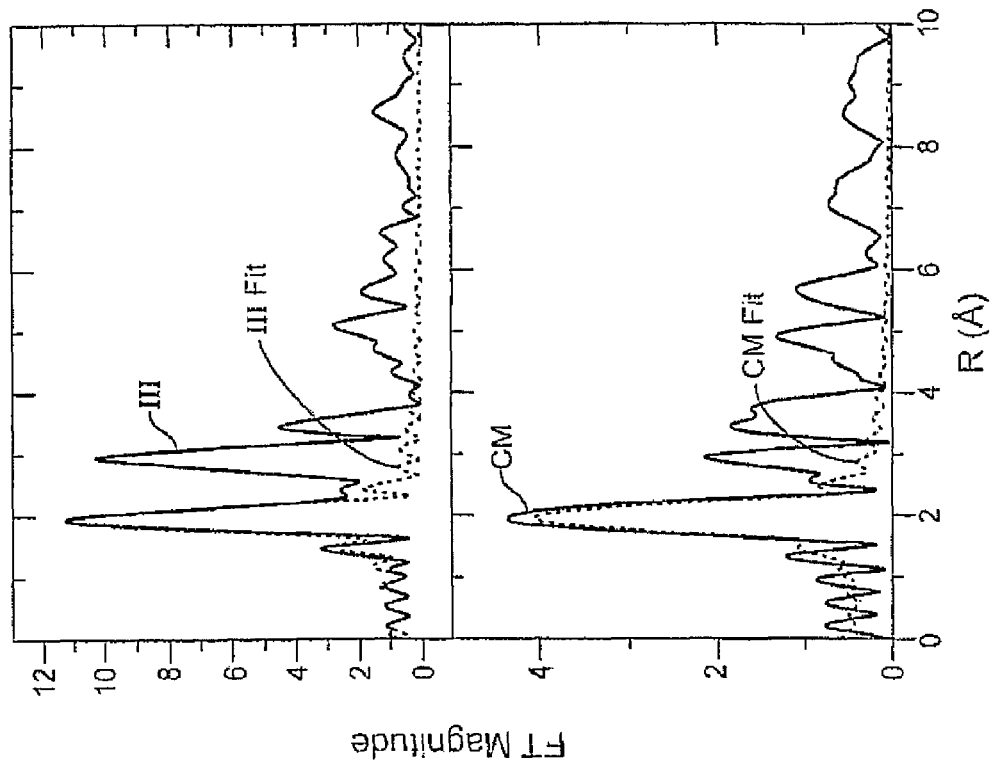
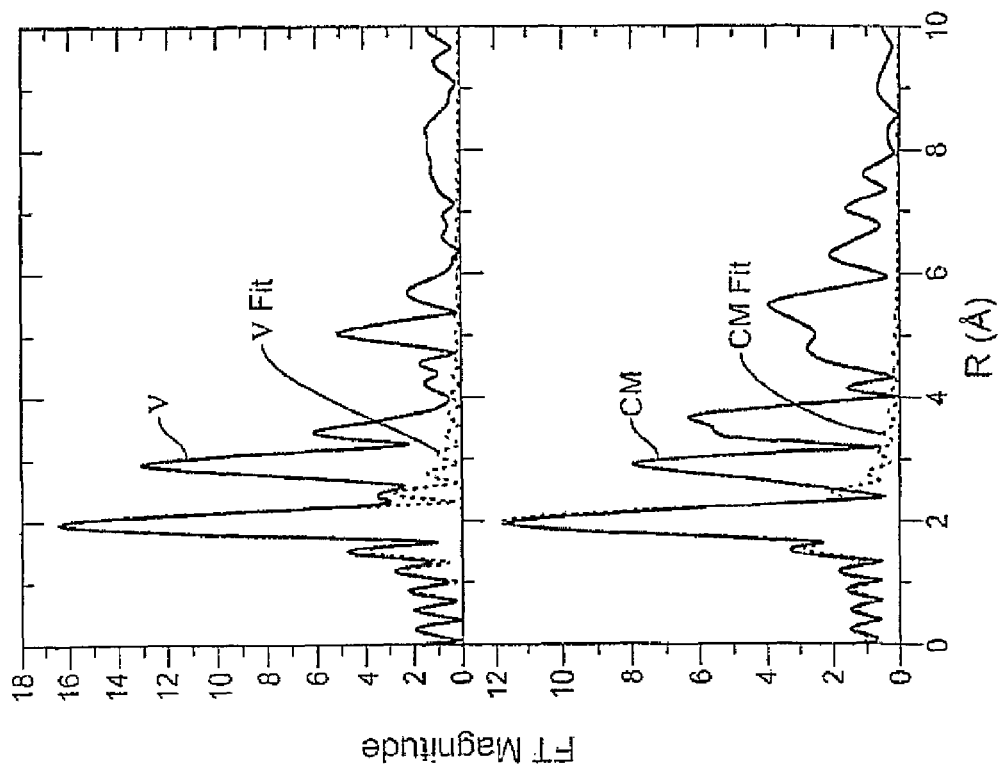

ELECTROCHEMICAL COMPOSITION AND ASSOCIATED TECHNOLOGY

CROSS-REFERENCE TO RELATED APPLICATIONS

This application is a continuation-in-part of U.S. patent application Ser. No. 11/940,276, filed on Nov. 14, 2007, which is a continuation-in-part of U.S. patent application Ser. No. 11/764,629, filed on Jun. 18, 2007. The aforementioned applications are also related to copending U.S. patent application Ser. No. 11/940,283, filed on Nov. 14, 2007, which is a continuation-in-part of the following applications: (1) U.S. patent application Ser. No. 11/747,746, filed on May 11, 2007, which is a continuation-in-part of U.S. patent application Ser. No. 11/510,096, filed on Aug. 25, 2006, which is a continuation-in-part of U.S. patent application Ser. No. 11/222,569, filed on Sep. 9, 2005, now abandoned, which claimed priority to Taiwanese Application No. 094115023, filed on May 10, 2005; and (2) U.S. patent application Ser. No. 11/518,805, filed on Sep. 11, 2006, which claims priority to Chinese Patent Application No. 200610080365.5, filed on May 11, 2006. Each of the aforementioned patent applications is incorporated herein by reference.

BACKGROUND

Many electrochemical applications and devices, such as electrochemical cells or batteries, for example, employ compositions that demonstrate electrochemical redox activity and/or are capable of participating in electrochemical redox reactions. Merely by way of example, secondary or rechargeable cells or batteries employing alkali ion compositions have generated considerable interest. Lithium ion batteries, for example, typically have a lithium ion electrolyte, a solid reductant as an anode, and a solid oxidant as a cathode, the latter typically being an electronically conducting host into which lithium ions are reversibly inserted from the electrolyte in the discharge stage and from which lithium ions are reversibly released back to the electrolyte in the charge stage. The electrochemical reactions taking place at the anode and the cathode are substantially reversible, rendering the battery substantially rechargeable.

Various solid compositions have been investigated as possible compositions for use as electrochemical redox active electrode materials. Such compositions include those having a spinel structure, an olivine structure, a NASICON structure, and/or the like, for example. Some of these compositions have demonstrated insufficient conductivity or operability or have been linked with other negative associations, such as being expensive or difficult to produce or polluting to the environment, for example.

Development of compositions suitable for use in electrochemical redox reactions, methods of making same, uses of same, and/or associated technology is generally desirable.

SUMMARY

A composition for use in an electrochemical redox reaction is described herein. Such a composition may comprise a material represented by a general formula $A_xM_yXO_4$, wherein in the general formula A represents at least one element selected from alkali metal elements, beryllium, magnesium, cadmium, boron, and aluminum; M represents at least one element selected from transition metal elements, zinc, cadmium, beryllium, magnesium, calcium, strontium, boron, aluminum, silicon, gallium, germanium, indium, tin, antimony, and bismuth; X represents at least one element selected from phosphorus, arsenic, silicon, and sulfur; O represents oxygen; x represents a number from about 0.8 to about 1.2 inclusive, and y represents a number of from about 0.8 to about 1.2 inclusive. Such a composition may also comprise an oxide component comprising an oxide of at least one element selected from beryllium, magnesium, calcium, strontium, boron, aluminum, silicon, gallium, germanium, indium, tin, antimony, bismuth, and Groups 3, 4, 5, 6, 7, 8, 9, 10 and 12 (new notation) of the Periodic Table of the Elements (hereinafter, simply Groups 3-10 and 12). The oxide component may be referred to herein simply as an oxide of at least one element described above, or simply as an oxide, merely by way of simplicity. The composition may be such that the material and the oxide are cocrystalline. An excess amount of the oxide, if any, may form a rim around a material-oxide cocrystalline structure. The composition may be nanoscale, comprised of nanoscale cocrystalline particles, for example.

A composition for use in an electrochemical redox reaction may comprise a material represented by a general formula $M_yXO_4$, wherein the material is capable of being intercalated with ionic A to form $A_xM_yXO_4$, wherein A, M, X, O, x and y are as described above. Merely by way of example, when the material is placed in a solution comprising ionic A in the presence of a reference electrode and subjected to an ion-insertion or intercalation process, it may form $A_xM_yXO_4$. Further, merely by way of example, when a material represented by the general formula $A_xM_yXO_4$ is placed in a solution comprising ionic A in the presence of a reference electrode and subjected to an ion-extraction or de-intercalation process, it may form $M_yXO_4$. Such a composition may also comprise an oxide as described above. The composition may be such that the material and the oxide are cocrystalline. The composition may be nanoscale, comprised of nanoscale cocrystalline particles, for example.

A composition described herein may be useful in a variety of applications, environments, and devices. By way of example, an electrode, such as a cathode, for example, may comprise a composition described herein. Further by way of example, an electrochemical cell, such as a battery, for example, may comprise a composition described herein.

A process of preparing a composition for use in an electrochemical redox reaction is also described herein. Such a process may comprise combining a first material comprising M, wherein M represents at least one element selected from transition metal elements, zinc, cadmium, beryllium, magnesium, calcium, strontium, boron, aluminum, silicon, gallium, germanium, indium, tin, antimony, and bismuth, and a solution comprising a second material comprising X, wherein X represents at least one element selected from phosphorus, arsenic, silicon, and sulfur. Depending on the nature of X, as just described, the second material may correspondingly comprise at least one material selected from phosphate, arsenate, silicate, and sulfate. The solution may comprise a surfactant sufficient to facilitate reaction of the first material and the second material. Combining the first material and the solution may produce a resulting solution.

A preparation process described herein may comprise combining the resulting solution and a third material comprising ionic A, wherein A represents at least one element selected from alkali metal elements, beryllium, magnesium, cadmium, boron, and aluminum, in a reaction solution. Combining the resultant solution and the third material may comprise adjusting pH of the reaction solution, which may facilitate reaction. A particle mixture may be obtained from the reaction solution. When the material being formed does not comprise an A component, a preparation process may comprise obtaining a particle mixture from the resulting solution described above, rather than the reaction solution just described.

Obtaining the particle mixture may comprise milling the particle mixture. Milling may result in the destruction of crystalline structure, such that the particle mixture is semicrystalline, for example.

A preparation process described herein may comprise milling the particle mixture with an oxide of at least one element selected from beryllium, magnesium, calcium, strontium, boron, aluminum, silicon, gallium, germanium, indium, tin, antimony, bismuth, and Groups 3-10 and 12. Milling may produce a semicrystalline particle mixture, which may be dried to provide a precursor. The particles of the semicrystalline particle mixture may be smaller than microscale, such as nanoscale, for example, in size. In such a case, the mixture may be referred to as a semicrystalline nanoscale particle mixture. The preparation process may comprise calcining the precursor to produce a nanoscale composition. Such calcining may comprise calcining the precursor in the presence of an inert gas, or in the presence of an inert gas and carbon particles suspended in the inert gas. The nanoscale composition may comprise a material represented by a general formula $A_xM_yXO_4$ or $M_yXO_4$ and the oxide in a cocrystalline form.

These and various other aspects, features, and embodiments are further described herein. Any other portion of this application is incorporated by reference in this summary to the extent same may facilitate a summary of subject matter described herein, such as subject matter appearing in any claim or claims that may be associated with this application.

BRIEF DESCRIPTION OF THE DRAWINGS

A description of various aspects, features, embodiments, and examples is provided herein with reference to the accompanying drawings, which are briefly described below. The drawings may illustrate one or more aspect(s), feature(s), embodiment(s), and/or example(s) in whole or in part. The drawings are illustrative and are not necessarily drawn to scale.

FIG. 1A and FIG. 1B may be collectively referred to herein as FIG. 1.

FIG. 3A, FIG. 3B and FIG. 3C are schematic illustrations is a schematic illustration of a structure of a material that may be formed during processing of precursor particles, as further described herein.

FIG. 5A and FIG. 5B may be collectively referred to herein as FIG. 5.

FIG. 9 is a graphical representation of radial structure function (FT magnitude) as a function of the interatomic distance, R (Å), obtained in connection with a composite material and a comparative material, including a graphical representation of theoretical results of an FEFF fit analysis of the composite material and the comparative material, as further described in Example 11.

FIG. 10 is a graphical representation of radial structure function (FT magnitude) as a function of the interatomic distance, R (Å), obtained in connection with a composite material and a comparative material, including a graphical representation of theoretical results of an FEFF fit analysis of the composite material and the comparative material, as further described in Example 12.

DESCRIPTION

Figure 1A:
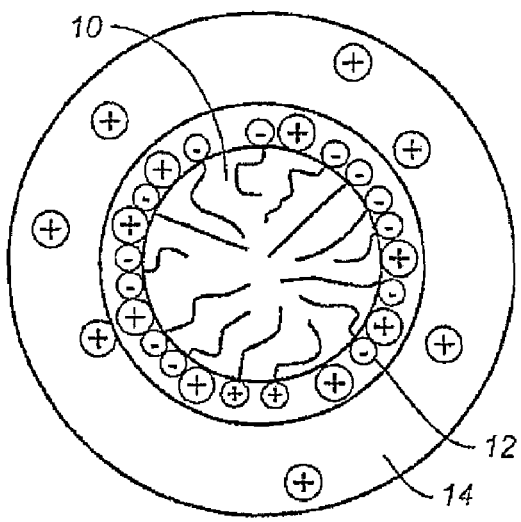
FIG. 1A and FIG. 1B are schematic illustrations of a reaction of a metal and a solution comprising a phosphate, as same may be facilitated by a surfactant, as further described herein.

A composition suitable for use in an electrochemical redox reaction is described herein. A process of making such a composition is also described herein. Additionally, a description of various aspects, features, embodiments, and examples, is provided herein.

It will be understood that a word appearing herein in the singular encompasses its plural counterpart, and a word appearing herein in the plural encompasses its singular counterpart, unless implicitly or explicitly understood or stated otherwise. Further, it will be understood that for any given component described herein, any of the possible candidates or alternatives listed for that component, may generally be used individually or in any combination with one another, unless implicitly or explicitly understood or stated otherwise. Additionally, it will be understood that any list of such candidates or alternatives, is merely illustrative, not limiting, unless implicitly or explicitly understood or stated otherwise. Still further, it will be understood that any figure or number or amount presented herein is approximate, and that any numerical range includes the minimum number and the maximum number defining the range, whether the word "inclusive" or the like is employed or not, unless implicitly or explicitly understood or stated otherwise. Generally, the term "approximately" or "about" or the symbol "~" in reference to a figure or number or amount includes numbers that fall within a range of ±5% of same, unless implicitly or explicitly understood or stated otherwise. Yet further, it will be understood that any heading employed is by way of convenience, not by way of limitation. Additionally, it will be understood that any permissive, open, or open-ended language encompasses any relatively permissive to restrictive language, less open to closed language, or less open-ended to closed-ended language, respectively, unless implicitly or explicitly understood or stated otherwise. Merely by way of example, the word "comprising" may encompass "comprising"-, "consisting essentially of"-, and/or "consisting of"-type language.

All patents, patent applications, publications of patent applications, and other material, such as articles, books, specifications, publications, documents, things, and/or the like, referenced herein are hereby incorporated herein by this reference in their entirety for all purposes, excepting any of same or any prosecution file history associated with same that is inconsistent with or in conflict with the present document, or that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

Various terms may be generally described, defined, and/or used herein to facilitate understanding. It will be understood that a corresponding general description, definition, and/or use of these various terms applies to corresponding linguistic or grammatical variations or forms of these various terms. It will also be understood that a general description, definition, and/or use, or a corresponding general description, definition, and/or use, of any term herein may not apply or may not fully apply when the term is used in a non-general or more specific manner. It will also be understood that the terminology used herein, and/or the descriptions and/or definitions thereof for the description of particular embodiments, is not limiting. It will further be understood that embodiments described herein or applications described herein, are not limiting, as such may vary.

Generally, the term "alkali metal element" refers to any of the metals in group IA of the periodic table, namely, lithium, sodium, potassium, rubidium, cesium, and francium. Generally, the term "transition metal element" refers to any of the elements 21 to 29 (scandium through copper), 39 through 47 (yttrium through silver), 57-79 (lanthanum through gold), and all known elements from 89 (actinium) onwards, as indicated by atomic numbers in the Periodic Table of Elements. Generally, the term "first row transition metal element" refers to any of the elements 21-29, namely, scandium, titanium, vanadium, chromium, manganese, iron, cobalt, nickel, and copper; the term "second row transition metal element" refers to any of the elements 39-47, namely, yttrium, zirconium, niobium, molybdenum, technetium, ruthenium, rhodium, palladium, and silver; and the term "third row transition metal element" refers to any of the elements 57-79, namely, lanthanum, hafnium, tantalum, tungsten, rhenium, osmium, iridium, platinum, and gold. Generally, the term "oxide" refers to a mineral in which at least one elemental atom, such as a metallic atom, for example, is bonded to at least one oxygen atom.

Generally, the term "crystalline" refers a characteristic of a material, namely, that of having the atoms of each element in the material arranged or bonded in a substantially regular, repeating structure in space. Generally, the term "semicrystalline" refers a characteristic of a material, namely, that of being composed partially of crystalline matter and partially of non-crystalline matter, such as amorphous matter, for example. Generally, the term "cocrystalline" refers to a characteristic of a material, namely, that of having a crystal aggregate and molecules distributed substantially evenly in the surface or in the molecular structure of the crystal aggregate. A cocrystalline material may thus comprise a mixed crystalline phase in which molecules are distributed within a crystal lattice that is associated with the crystal aggregate. A cocrystalline characteristic may occur via any suitable process, such as paragenesis, precipitation, and/or spontaneous crystallization, for example. Generally, the term "nanoscale" refers a characteristic of a material, namely, that of being composed of particles, the effective diameter of an individual particle of which is less than or equal to about 500 nanometers, such as from about 200 nanometers to about 500 nanometers, inclusive, or from about 300 nanometers to about 500 nanometers, for example.

Generally, the term "milling" refers to grinding of a material. Ball mills and pebble mills are examples of apparatus that may be used for milling. Generally, the term "calcining" refers to heating a material to a temperature below its melting point to bring about loss of moisture, reduction, oxidation, a state of thermal decomposition, and/or a phase transition other than melting. Generally, the term "surfactant" refers to a surface-active agent.

Generally, the term "electrode" refers to a working electrode at which a material is electrooxidized or electroreduced. Anodes and cathodes are examples of electrodes. Generally, other specific electrodes, such as reference electrodes, are specified as such herein. Generally, the term "electrochemical cell" refers to a cell at which an electrochemical reaction may take place. Electrochemical fuel cells, power cells, and batteries are examples of electrochemical cells.

A composition suitable for use in an electrochemical redox reaction is now described. Such a composition may comprise a material represented by a general formula I: $A_xM_yXO_4$, which is further described below.

In the general formula I, A represents at least one element selected from alkali metal elements, beryllium, magnesium, cadmium, boron, and aluminum. Examples of some suitable alkali metal elements include lithium, sodium, and potassium. As mentioned previously, batteries employing alkali ion compositions, such as lithium ion compositions, have been the subject of considerable interest. Accordingly, an example of a suitable alkali metal element is lithium, as further demonstrated herein.

In the general formula I, M represents at least one element selected from transition metal elements, zinc, cadmium, beryllium, magnesium, calcium, strontium, boron, aluminum, silicon, gallium, germanium, indium, tin, antimony, and bismuth. Examples of some suitable transition metal elements include first row transition metal elements, second row transition metal elements, and third row transition metal elements. An example of a suitable first row transition metal element is iron. Further, in the general formula I, X represents at least one element selected from phosphorus, arsenic, silicon, and sulfur, and O represents oxygen.

In the general formula I, x represents a number from about 0.8 to about 1.2 inclusive, such as from about 0.9 to about 1.1 inclusive, for example. When A represents more than one element, the x of $A_x$ represents a number that is the total of each of the numbers associated with each of those elements. For example, if A represents Li, Na, and K, the x1 of $Li_{x1}$ represents a first number, the x2 of $Na_{x2}$ represents a second number, and the x3 of $K_{x3}$ represents a third number, such that $A_x$ represents $Li_{x1}Na_{x2}K_{x3}$, then the x of $A_x$ represents the sum of the first number represented by x1, the second number represented by x2, and the third number represented by x3. In the general formula I, y represents a number from about 0.8 to about 1.2, such as from about 0.9 to about 1.1 inclusive, for example. When M represents more than one element, the y of $M_y$ represents a number that is the total of each of the numbers associated with each of these elements. For example, if M represents Fe, Co, and Ni, the y1 of $Fe_{y1}$ represents a first number, the y2 of $Co_{y2}$ represents a second number, and the y3 of $Ni_{y3}$ represents a third number, such that $M_y$ represents $Fe_{y1}Co_{y2}Ni_{y3}$, then the y of $M_y$ represents the sum of the first number represented by y1, the second number represented by y2, and the third number represented by y3. The number represented by x and the number represented by y in the general formulas I, II and III described herein may be determined by a suitable technique, such as atomic emission spectrometry (AES) that relies on inductively coupled plasma (ICP), for example. See Goldstone et al., *Introduction to Atomic Emission Spectrometry*, ICP Optical Emission Spectroscopy, Technical Note 12, incorporated herein by reference. Merely for purposes of convenience or simplicity, each of x and y of general formulas I, II and III described herein may appear as representing the number 1, while still maintaining its broader meaning.

A suitable composition may also comprise an oxide of at least one element selected from beryllium, magnesium, calcium, strontium, boron, aluminum, silicon, gallium, germanium, indium, tin, antimony, bismuth, and Groups 3-10 and 12. Examples of some suitable transition metal elements include any of the foregoing elements selected from first row transition metal elements, second row transition metal elements, and third row transition metal elements. Examples of suitable first row transition metal elements include titanium, vanadium, and chromium.

The composition may be such that the material represented by the general formula I described above and the oxide described above are cocrystalline. In such a case, the cocrystalline material may be represented by a general formula II: $A_xM_yXO_4.zB$, wherein A, M, X, O, x and y are as described above in connection with the material represented by general formula I, B represents the oxide described above, z represents a number greater than 0 and less than or equal to about 0.1, and the symbol, ., represents cocrystallinity of the material and the oxide. The number represented by z in the general formulas II and III described herein may be determined via any suitable technique, such as AES/ICP techniques mentioned above, for example. The number represented by z represents a mole ratio of the B component relative to the composition. Merely for purposes of convenience or simplicity, z may appear in an unspecified manner, while still maintaining its broader meaning.

The general formulas I, II and III described herein indicate the presence of four oxygen constituents. It is believed that in the case in which the material represented by the general formula I and the oxide form a cocrystal, the crystalline lattice structure associated with the material represented by the general formula I is altered during formation of the cocrystal represented by general formula II or general formula III. Merely by way of example, the lattice structure of the cocrystalline composition may differ, with at least one constant of lattice constants a, b, and c and lattice volume (a×b×c) or unit cell volume differing from the lattice structure, constants, and volume, respectively, of the material represented by the general formula I. Data concerning the lattice structure, namely, lattice constants a, b, and c and lattice volume, of various cocrystalline compositions are provided herein.

It is believed that in this alteration, at least a portion of the oxygen constituents in the cocrystalline composition may be more closely associated with M than with X of the general formula II or the general formula III, although it may be difficult or impossible to determine the precise nature of this association by present methods, such as AES/ICP techniques mentioned above, for example. It is believed that any binding association between any portion of the oxygen constituents and M or X is covalent in nature. Each of the general formulas II and III is general in this sense and represents the cocrystalline composition regardless of the precise association of any portion of the oxygen constituents with M or X, and thus, encompasses what might otherwise be represented by $A_xM_yO_{4-w}XO_w.zB$ or $A_xM_yO_{4-w}XO_w.zB/C$, respectively, where w represents a number from about 0 to about 4, such as $A_xM_yXO_4.zB$ or $A_xM_yXO_4.zB/C$, respectively, where w represents 4, for example, $A_xM_yO_2XO_2.zB$ or $A_xM_yO_2XO_2.zB/C$, respectively, where w represents 2, for example, or $A_xM_yO_4X.zB$ or $A_xM_yO_4X.zB/C$, respectively, where w represents 0, for example. Merely by way of example, w may represent a number from greater than 0 to less than about 4.

It is believed that a cocrystalline structure (i.e., differing from the crystal structure of the material represented by the general formula I) may facilitate an ion-insertion process or intercalation process and an ion-extraction or de-intercalation process involving A, and as such, may facilitate any such processes. An example of an ion-extraction process or de-intercalation process involving the oxidation of the iron center (M=Fe) of a cocrystalline composite material, $LiFe(II)PO_4.ZnO/C$, from Fe(II) to Fe(III), and an ion-insertion process involving the reduction of the iron center (M=Fe) of a co-crystalline composite material, $Fe(III)PO_4.ZnO/C$, from Fe(III) to Fe(II), is provided in Example 7 herein. It is believed that the example demonstrates the ion-conductivity of the $LiFe(II)PO_4.ZnO/C$ cocrystalline composite material and its $Fe(III)PO_4.ZnO/C$ counterpart cocrystalline composite material.

A composition described herein may be such that the material represented by the general formula I and the oxide form a cocrystalline material. As mentioned above, such a composition may be represented by the general formula II when the material and the oxide are in a cocrystalline form. An excess amount of oxide, if any, may form a substantially uniform rim that at least partially surrounds, such as substantially surround, for example, the cocrystalline material. Such a composition may have at least one layer, such as a layer or coating of carbon particles, for example. If a rim of oxide is present, the result will be a multilayered configuration. The composition may be represented by a general formula III:

$A_xM_yXO_4.zB/C$, when the material and the oxide are in a cocrystalline form and the carbon particles, represented by C, form a layer or coating, wherein the "/" symbol represents an interface between the cocrystalline form and the carbon layer, and the absence or presence of an excess oxide rim is unspecified. The carbon particles may serve to enhance the conductivity of the composition.

A composition represented by the general formula II or III may be nanoscale, comprised of nanoscale cocrystalline particles. An individual nanoscale cocrystalline particle may have an effective diameter which is less than or equal to about 500 nanometers, such as from about 200 nanometers to about 500 nanometers, inclusive, for example. It is believed that the nanoscale aspect of the particles of the composition is associated with a relatively higher discharge capacity of the composition. That is, a nanoscale composition described herein would be expected to be associated with a higher discharge capacity than a non-nanoscale version of a composition described herein under the same conditions. Any nanoscale compositions described herein may have an excess oxide rim, as described above that is less than or equal to about 10 nanometers in thickness, such as about 5 or about 3 nanometers in thickness, for example.

As mentioned above, a composition for use in an electrochemical redox reaction may comprise a material represented by a general formula $M_yXO_4$, wherein the material is capable of being intercalated with ionic A to form $A_xM_yXO_4$, wherein A, M, X, O, x and y are as described above. For such a composition, general formulas I, II and II may take the form of corresponding general formula I: $M_yXO_4$; general formula II: $M_yXO_4.zB$; and general formula III: $M_yXO_4.zB/C$, respectively, where M, X, O, B, C, y and z are as described above. Merely by way of example, when such a material is placed in a solution comprising ionic A in the presence of a reference electrode and subjected to an ion-insertion or intercalation process, it may form $A_xM_yXO_4$, $A_xM_yXO_4.zB$, or $A_xM_yXO_4.zB/C$, respectively. Further, merely by way of example, when a material represented by the general formula $A_xM_yXO_4$, $A_xM_yXO_4.zB$, or $A_xM_yXO_4.zB/C$ is placed in a solution comprising ionic A in the presence of a reference electrode and subjected to an ion-extraction or de-intercalation process, it may form $A_xM_yXO_4$, $A_xM_yXO_4.zB$, or $A_xM_yXO_4.zB/C$, respectively.

A composition described herein may be useful in a variety of applications, environments, and devices. By way of example, an electrode, such as a cathode, for example, may comprise a composition described herein. Further by way of example, an electrochemical cell, such as a battery, for example, may comprise a composition described herein. Examples of suitable compositions, applications, environments, and devices are provided herein, after a description of a process for preparing a composition, as now described.

A process of preparing a composition for use in an electrochemical redox reaction may comprise combining a first material comprising M, wherein M represents at least one element selected from transition metal elements, zinc, cadmium, beryllium, magnesium, calcium, strontium, boron, aluminum, silicon, gallium, germanium, indium, tin, antimony, and bismuth, and a solution comprising a second material comprising X, wherein X represents at least one element selected from phosphorus, arsenic, silicon, and sulfur. The combining may comprise mixing, such as thorough mixing or stirring, for example. Merely by way of example, M may represent Fe.

As to the solution, when X represents phosphorus, the second material may be in phosphate form; when X represents arsenic, the second material may be in arsenate form; when X represents silicon, the second material may be in silicate form; when X represents sulfur, the second material may be in sulfate form; or when X represents more than one of foregoing elements, the second material may be in more than one of the foregoing forms, accordingly. By way of example, a solution comprising a phosphate and/or an arsenate, may be prepared by dissolving phosphoric acid and/or a salt thereof, and/or arsenic acid and/or a salt thereof, respectively, in an aqueous medium, such as deionized water.

The solution may comprise a surfactant and/or a pH-adjusting agent sufficient to facilitate reaction of the first material and the second material. Such a surfactant and/or agent may be sufficient to adjust the pH of the solution to a level suitable for the formation of a protective shell, as further described in the example below. Any suitable amount of surfactant and/or agent may be used, such as about 1 ml of surfactant, for example. Examples of suitable surfactants include ionic, non-ionic, and amphoteric surfactants. Examples of suitable surfactants include DNP (dinitrophenyl, a cationic surfactant), Triton X-100 (octylphenol ethoxylate, a non-ionic surfactant), and BS-12 (dodecyl dimethyl betaine or cocoal kanoyl amido propyl betaine, an amphoteric surfactant), merely by way of example. Any suitable pH-adjusting agent, such as $NH_3$ or $NH_4OH$, for example, or suitable combination thereof may be used. Any such surfactant and/or agent may be added to the solution under suitable mixing conditions, such as thorough mixing or stirring, for example. The solution may be sufficient without a surfactant, a pH-adjusting agent, and/or adjustment of pH.

Combining the first material and the solution may produce a resulting solution, which comprises a reaction product. Merely by way of convenience or simplicity in this portion of the description, M will now be referred to as a single metal element, such as Fe, for example, even though it may be other than a metal element or may be more than one element, as noted above, and X will now be referred to as comprising simply phosphorus, even though it may comprise phosphorus, arsenic, silicon and/or sulfur, as noted above. The first material comprising the metal and the solution comprising the phosphate may be combined, such that the metal and the phosphate react, and a resulting solution comprising the reaction product is provided. The reaction may take place over a suitable period, such as about 12 hours, for example.

It is believed that during the reaction of the metal and the phosphate, a protective shell, which may be referred to as a self-assembled colloidal monolayer husk, is formed. It is further believed that if the free acid content in the solution comprising the phosphate is too low, the protective shell is difficult to dissolve, and if the free acid content in the solution is too high, the protective shell is more readily dissolved, such that shell formation is hindered. (In the case of X comprising phosphorus, arsenic, silicon, and/or sulfur and the solution comprising a corresponding second material or corresponding second materials, it is believed that a protective shell would be formed and would be affected by free acid content levels in a similar manner.) As such, the pH of the solution may be adjusted for suitable shell formation. An example of a suitable pH range is from about 1 to about 2.5. It may be that the pH of the solution is sufficient, such that no pH adjustment is desirable or need be made.

Figure 1B:
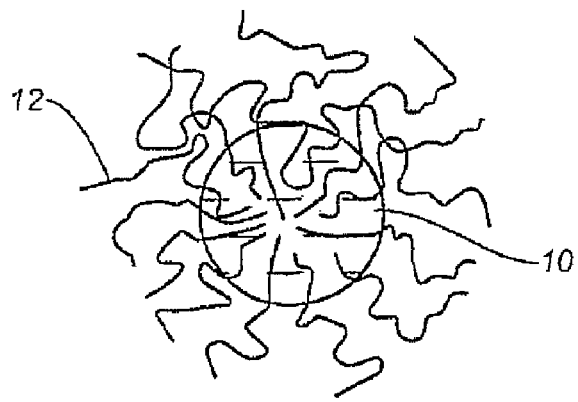

A suitable surfactant and/or pH-adjusting agent, such as any mentioned above, or a suitable combination thereof, may be used to adjust pH of the solution, to facilitate shell formation, and/or to facilitate reaction of the metal and the phosphate. Any such facilitation may comprise enhancing a rate of reaction relative to a rate of reaction when a surfactant or an agent is not employed, and/or allowing the reaction to take place at a reduced temperature, such as from about 20° C. to about 35° C., for example, relative to a temperature, such as from about 70° C. to about 80° C., for example, when the surfactant or agent is not employed. It is believed that one or more suitable surfactant(s) may facilitate reaction of the metal and the phosphate in a manner such as that schematically illustrated in FIGS. 1A and 1B (collectively, FIG. 1) and now described. As shown in FIG. 1, during the reaction of the metal and the phosphate, the metal particle 10 may be at least partially surrounded by a protective shell 12. Generally, the shell 12 may hinder contact between the metal particle 10 and the phosphate in the solution, such that reaction involving the two is hindered. It is believed that a suitable surfactant may be used to facilitate detachment of the shell 12 from the metal particle 10, such that reaction between the metal particle 10 and the phosphate is facilitated, such as allowed to proceed substantially continuously, for example. The shell 12 may be electrically charged or electrically neutral. If the shell 12 is electrically charged, an ionic surfactant or an amphoteric surfactant may be attracted to the surface of the shell, via electrostatic attraction, for example, such that a surfactant diffusion layer 14 is formed. If the shell 12 is electrically neutral, a non-ionic surfactant may be adsorbed onto the surface of the shell, via a van der Waal force, for example. Any such interaction between the shell 12 and the surfactant may facilitate detachment of the shell from the metal particle 10, such that reaction of the metal particle with the phosphate is the solution may suitably proceed. (In the case of X comprising phosphorus, arsenic, silicon, and/or sulfur and the solution comprising a corresponding second material or corresponding second materials, it is believed that a protective shell would be formed and the reaction would be affected by surfactant interaction in a similar manner.)

As mentioned above, the reaction may provide a resulting solution comprising the reaction product. The reaction product may be represented by a general formula, $MXO_4$. Merely by way of example, when M is Fe and X is P, the reaction sequence may be that shown in Reaction I set forth below, wherein parenthetical material immediately to the right of the iron element indicates its valence state.

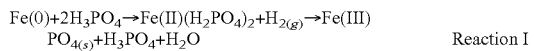

Reaction I

A preparation process described herein may comprise combining the resulting solution described above and a third material comprising ionic A, wherein A represents at least one element selected from alkali metal elements, beryllium, magnesium, cadmium, boron, and aluminum, in a reaction solution. Merely by way of convenience or simplicity in this portion of the description, A will now be referred to as a single alkali metal element, such as Li, for example, even though it may be other than an alkali metal element or may be more than one element, as noted above. In such an example, the third material may comprise lithium hydroxide monohydrate and/or lithium chloride, merely by way of example. Combining the resultant solution and the third material may comprise mixing, such as thorough mixing or stirring or milling, for example. The mixing may be for a suitable period, such as milling via a ball mill for about four hours, for example, or for a time sufficient to break down, destroy, or reduce crystalline structure. Combining the resultant solution and the third material may comprise adjusting pH of the reaction solution, which may facilitate reaction. An example of a suitable pH range is from about 7 to about 11. It may be that the pH of the solution is sufficient, such that no pH adjustment need be made. Combining the resultant solution and the third material may result in a reaction solution suitable for further processing, as further described herein.

When the material being formed does not comprise an A component, a preparation process may comprise obtaining a particle mixture from the resulting solution described above, rather than the reaction solution just described. Any suitable pH adjustment and/or mixing may be employed.

A particle mixture may be obtained from the reaction solution or from the resulting solution, as described above. Obtaining this mixture may comprise filtering the solution to obtain a solid-state mixture. The particle mixture may be substantially amorphous. The particle mixture may comprise some crystalline material. The particle mixture may be milled sufficiently to break down, destroy, or reduce crystalline structure and render the particle mixture semicrystalline, such as partly crystalline and partly amorphous, for example. The particle mixture may be milled sufficiently such that the particles in the particle mixture are less than microscale, such nanoscale, for example, in size. The milling period may be sufficiently long to facilitate such "nanoscaling" of the particle mixture. In the milling process, the particle mixture may be in solution. Merely by way of example, the milling may be via a ball mill and the milling period may be for about four hours. The combining of the resulting solution and the third material and the milling process may take place sequentially or substantially simultaneously. Merely by way of example, the combining of the resulting solution and the third material may be represented by a reaction sequence, such as that shown in Reaction II set forth below, when M is Fe, X is P, and A is Li, wherein parenthetical material immediately to the right of the iron element indicates its valence state, wherein parenthetical material immediately to the right of the lithium element indicates its valence state, and wherein the "/" symbol represents what is believed to be an interface between the Li(I) and the Fe(III)PO_4.

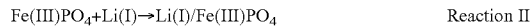

Reaction II

The first material, the second material, and/or the third material may be combined sequentially, such as in the manner described above or in any appropriate manner, for example, or substantially at one time, in any appropriate manner. The combining of these materials may result in a particle mixture which may be further processed as described herein.

A preparation process described herein may comprise combining the particle mixture with an oxide of at least one element selected from beryllium, magnesium, calcium, strontium, boron, aluminum, silicon, gallium, germanium, indium, tin, antimony, bismuth, and Groups 3-10 and 12. The combining may comprise a milling process. In the milling process, the particle mixture and the oxide may be in solution. Milling may produce a semicrystalline particle mixture, the particles of which may smaller than microscale, such as nanoscale, for example, in size. It is believed that a nanoscale particle of such a mixture may comprise $MXO_4$, ionic A, and the oxide. Merely by way of example, when M is Fe, X is P, A is Li, and B represents the oxide component, the reaction sequence may be that shown in Reaction III set forth below, wherein parenthetical material immediately to the right of the iron element indicates its valence state, wherein parenthetical material immediately to the right of the lithium element indicates its valence state, and wherein the "/" symbol represents what is believed to be an interface between the Li(I) and the Fe(III)PO_4.

Reaction III

Examples of suitable preparation processes are provided herein, such as those provided in Examples 1-3. Modifications of the preparation process described herein are possible. For example, the oxide of at least one element selected from beryllium, magnesium, calcium, strontium, boron, aluminum, silicon, gallium, germanium, indium, tin, antimony, bismuth, and Groups 3-10 and 12, may be added at any suitable time before a precursor, further described below, is provided. It is believed that the oxide will not participate in the reactions occurring before that time, as described above, such that it may be added at any suitable or convenient time before the precursor is provided, such as any time before or during the drying of the particle mixture to provide the precursor, for example. Merely by way of example, rather than combining the resulting solution and the third material comprising ionic A as described above, the resulting solution, the third material comprising ionic A, and the oxide may be combined.

A semicrystalline nanoscale particle mixture, such as that described above, for example, may be dried to provide a precursor. Any sufficient drying process may be used, such as spray-drying, for example. Merely by way of example, a semicrystalline nanoscale particle mixture may be processed to form droplets of nanoscale particles. Such a process may comprise centrifuging the mixture. This centrifuging may take place in a warm or hot environment, such as a warm or hot environment of air. This centrifuging make take place over a certain period, determining a spinning or "fly" time. It is believed that as the mixture is centrifuged, such that it forms droplets which "fly" and develop increased surface tension as the spinning proceeds, the droplets tend to become substantially spherical. It is believed that via capillary action acting on pores of the nanoscale particles, moisture from the interiors of the particles moves toward the surfaces of the particles. It is further believed that when the surfaces of the particles encounter the surrounding warm or hot environment, moisture at those surfaces evaporates, such that the particles are dried. It may be possible to control certain parameters associated with a drying or centrifuging process or environment, such as the time ("fly" time, for example), temperature (chamber temperature, for example), or environment (air temperature, for example) associated with the process or the equipment associated with the process, to obtain suitable results. A precursor resulting from a suitable drying of a semicrystalline nanoscale particle mixture described herein may comprise substantially dry, spherical particles. Such particles may comprise $MXO_4$, ionic A, and the oxide, B, as previously described.

Figure 2:
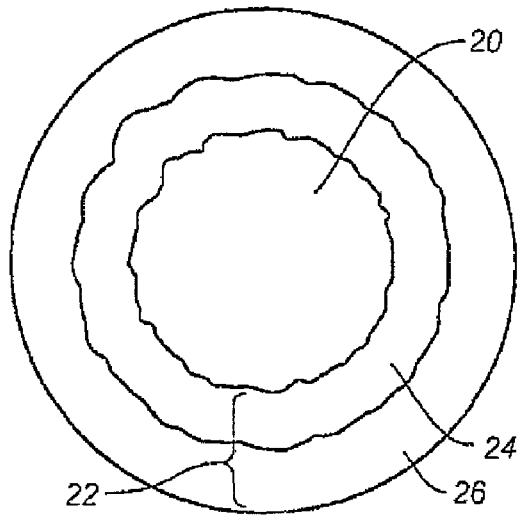
FIG. 2 is a schematic illustration of a precursor particles, as further described herein.

A precursor particle is schematically illustrated in FIG. 2. The particle may comprise a matrix portion 20 which may comprise $MXO_4$, and an edge or border portion 22 which may at least partially surround, such as substantially surround, for example, the matrix portion. The border portion 22 may comprise ionic A, when A is present, and the oxide component. By way of example, the border portion 22 may comprise an interface, an innermost layer 24 of which may comprise ionic A, when A is present, and an outermost layer 26 of which may comprise the oxide component, wherein the outermost layer may at least partially surround, such as substantially surround, for example, the innermost layer.

A preparation process described herein may comprise calcining the precursor to produce a nanoscale composition. Any suitable calcining process may be used. Merely by way of example, calcining may comprise calcining the precursor in the presence of an inert gas, such as argon gas or nitrogen gas, for example, or in the presence of an inert gas and carbon particles suspended in the inert gas. Calcining may take place in a furnace into which a precursor and carbon particles are introduced. The carbon particles may be smaller in size than the precursor particles. Merely by way of example, an individual carbon particle may be less than or equal to about 100 nanometers in effective diameter. An inert gas may be introduced into the furnace, such as in a circular or other suitable flow pattern, for example, causing the precursor and the carbon particles to become suspended in the gas and mixed. Calcining may take place at any suitable temperature of up to about 900° C., such as about 800° C., for example. Any unwanted products of any such process such as moisture, reacted gases, and/or carbon dioxide, for example, may be exhausted by the inert gas. It is believed that during such a process, carbon particles may at least partially fill pores of the precursor particles, perhaps via shearing stress generated between adjacent particles in the mixture, for example.

An agent sufficient to modify the valence state of the M component may be added at any suitable time, in any suitable manner. Such an agent may be added before or during calcining. Merely by way of example, a reducing agent may be added to reduce the valence state of the M component or an oxidizing agent may be added to increase the valence state of the M component. Examples of suitable reducing agents include any comprising carbonaceous material, such as charcoal, graphite, coal, a carbon powders and/or an organic compound, such as sucrose or a polysaccharide, merely by way of example. Reducing agents including carbonaceous material may also serve as a source of carbon, and may thus facilitate carbon coating.

It is believed that the precursor particles are subjected to various processes during calcination. By way of example, it is believed that in an initial stage of calcination, which may comprise heat treatment at temperatures from about 25° C. to about 400° C. and a treatment time of about 4 to about 6 hours, for example, the precursor particles undergo surface diffusion, bulk diffusion, evaporation, and condensation. It is believed that gas, such as carbon dioxide gas, for example, in the pores of the material may be expelled during these processes initial stage. It is believed that these processes result in particles, an individual particle of which may comprise a cocrystalline matrix portion, an intermediate or border portion which may at least partially surround, such as substantially surround, for example, the matrix portion, and an outer portion which may at least partially surround, such as substantially surround, for example, the intermediate portion. The matrix portion may comprise $M_yXO_4$ or $A_xM_yXO_4$, the border portion may comprise the oxide component, B, and an outer portion may comprise an excess of the oxide component, B, when such an excess is present, and/or carbon, when carbon is present during calcination. Merely by way of example, the compound may be represented by C/B/[Li(I)/Fe(II)$PO_4$] when the calcination comprises mixing with carbon represented by C, and when M, X, A, B, and the parenthetical material are as described above in connection with Reaction III, for example. In this example, the valence state of the iron element has been reduced from III to II.

Further by way of example, it is believed that in an intermediate stage of calcination, which may comprise heat treatment at temperatures from about 400° C. to about 800° C. and a treatment time of about 4 to about 6 hours, for example, the precursor particles undergo some reorganization. For example, it is believed that constituents of the layered crystalline material undergo a slow diffusion followed by a quicker diffusion into the crystal grain boundary of the material, such that an orthorhombic crystal structure is formed. It is believed that at the same time, the outer portion, whether comprising an excess of the oxide component, B, and/or carbon, undergoes diffusion, such that it closely surrounds the matrix portion and the border portion of the crystalline material. Merely by way of example, the resulting material may be represented by C/[Li(I)/Fe(I)PO$_4$.B] when the calcination comprises mixing with carbon represented by C, when M, X, A, B, and the parenthetical material are as described above in connection with Reaction III, for example, and wherein the "." symbol represents what is believed to be a cocrystalline configuration.

As now described in relation to the schematic illustration of FIG. 3A, it is believed that a matrix 30 of the crystalline material comprises polymeric chains (not shown), each of which comprises an octahedral structure, a tetrahedral structure, and a lithium ion. Several octahedral structures 32 and tetrahedral structures 34, arranged along the a-c plane, are shown in FIG. 3A. In each octahedral structure 32, each central M component (not shown) has a slightly distorted octahedral coordination geometry formed by six oxygen atoms 36 (not all of which can be seen in FIG. 3A) shown at the corners of the octahedral structure. In each tetrahedral structure, each central X (not shown) component has a tetrahedral coordination geometry formed by four oxygen atoms 36 (not all of which can be seen in FIG. 3A) shown at the corners of the tetrahedral structure, two of which are shared with an adjacent octahedral structure. It is believed that when the A component is present, within the matrix and beside these various geometrical structures are ions 38 of the A component, which may serve to balance the valence state associated with the M component, such that the overall structure is substantially neutral. These ions 38 of the A component may be more closely associated with the octahedral structures 32 than the tetrahedral structures 34 of the matrix 30. Further, it is believed that beyond, but closely associated with the matrix 30 and its various components just described, are the oxide components (not shown) of the crystalline material. Still further, when carbon particles are present during calcination, it is believed that carbon components (not shown) would be present adjacent the matrix 30, but beyond the oxide components just described.

Still further by way of example, it is believed that in a late stage of calcination, which may comprise heat treatment at a temperature of about 800° C. and a treatment time of about 4 hours, for example, the crystalline material undergoes gradual compacting. It is believed that the resulting material comprises a cocrystalline structure, that comprises the matrix 30 and its components, as illustrated in FIG. 3A, and the oxide components, in a cocrystalline form. The resulting material may be represented by the general formula II, when carbon particles are not present during calcination. The resulting material may be represented by the general formula III, when carbon particles are present during calcination, such that a base cocrystalline structure, which may be represented by the general formula II, is at least partially surrounded, such as substantially surrounded, for example, by a layer of carbon particles, represented by C in the general formula III. A schematic illustration of such a cocrystalline structure 40 appears in FIG. 3B, wherein a matrix cocrystalline portion 42 described above is surrounded by a border portion 44 comprising an excess of the oxide component, which is coated with carbon particles 46. A schematic illustration of another such cocrystalline structure 48 appears in FIG. 3C, wherein a matrix cocrystalline portion 42 described above is may be at least partially surrounded, such as substantially surrounded, for example, by a layer or coating of carbon particles (not shown).

Merely by way of example, the resulting material may be represented by C/[Li(I)/Fe(II)PO$_4$.B] when the calcination comprises mixing with carbon represented by C, when M, X, A, B, and the parenthetical material are as described above in connection with Reaction III, for example, and wherein the "." symbol represents what is believed to be a cocrystalline configuration. In such a case, a reaction sequence associated with the initial, intermediate, and later calcination stages may be that shown in Reaction IV below.

B/[Li(I)/Fe(III)PO$_4$]→C/B/[Li(I)/Fe(II)PO$_4$]→C/[Li(I)Fe(II)PO$_4$.B]→C/[Li(I)Fe(II)PO$_4$.B]   Reaction IV The material resulting from calcination may also be represented as C/[Li(I)$_x$Fe(II)$_y$PO$_4$.zB], as described herein.

It is believed that when the oxide component used in the preparation process is an oxide of copper, the oxide may be reduced during calcination, such as calcination in inert gas, for example, such that the resulting material comprises a copper component in place of the oxide component. In such a case, the material resulting from calcination may be represented as described herein, with the exception that Cu replaces the oxide component, B. It is believed that a similar phenomenon occurs when the oxide component is an oxide of other elements from Group 11 of the Periodic Table of Elements, such as silver and gold, for example.

Examples of suitable preparation processes are provided here, such as those provided in Examples 1-3. Modifications of the preparation process described above are possible. For example, the oxide of at least one element selected from beryllium, magnesium, calcium, strontium, boron, aluminum, silicon, gallium, germanium, indium, tin, antimony, bismuth, and Groups 3-10 and 12, may be added at any suitable time before the precursor is provided. It is believed that the oxide will not affect the reactions occurring before that time, as described above, such that it may be added at any suitable or convenient time before the precursor is provided, such as any time before or during the drying of the particle mixture to provide the precursor, for example.

A resulting nanoscale composition described herein may comprise a material represented by a general formula A$_x$M$_y$XO$_4$ and the oxide in a cocrystalline form. The composition may be represented by the general formula II or III, for example. The composition may be substantially neutral across its structure. When a voltage is applied to the composition, a central metal M may be oxidized such that the matrix of the composition is substantially neutral in charge. An ion of A may be released and an electron generated to balance the overall valence state of the composition. When the composition is in an inert environment, a central metal M may be reduced and a current generated to stabilize the structure of the composition. It is believed that the presence of the oxide and the carbon particles may serve to enhance the electrochemical reversibility of the composition. The composition is believed to have good structural stability and electrochemical reversibility.

Merely by way of example, a nanoscale cocrystalline composition represented by M$_y$XO$_4$.zB, M$_y$XO$_4$.zB/C, A$_x$M$_y$XO$_4$.zB or A$_x$M$_y$XO$_4$.zB/C may be such that A, where present, represents at least one element selected from lithium and sodium; M represents at least one element M1 selected from manganese, iron, cobalt, and nickel, and at least one element M2 selected from titanium, vanadium, chromium, manganese, iron, cobalt, nickel, copper, zinc, magnesium, aluminum, silicon, gold, antimony, and lanthanum, wherein M1 and M2 are not the same; X represents phosphorus; O represents oxygen, the oxide B is an oxide of at least one element selected from titanium, vanadium, chromium, manganese, iron, cobalt, nickel, zinc, magnesium, aluminum, silicon, antimony, and lanthanum; and x, y, and z are as described previously herein. In such a composition, M1 and the at least one element associated with the oxide B may be different.

Further, merely by way of example, where $M_y$ represents $M1_{y1}M2_{y2}$, y1 and y2 may be such that y1 represents a number that equals one minus the number represented by y2. Merely by way of example, y2 may be from about zero to about 0.2, inclusive. As mentioned previously, at least a portion of the oxygen constituents in the cocrystalline composition may be more closely associated with M than with X.

It is believed that in the $M_yXO_4.zB$, $M_yXO_4.zB/C$, $A_xM_yXO_4.zB$ or $A_xM_yXO_4.zB/C$ composite compositions described herein, the oxide component, B, is cocrystallized on or in the corresponding $M_yXO_4$ or $A_xM_yXO_4$ material or particles. Further, it is believed that while an excess of the oxide component may form a substantially uniform rim outside the $M_yXO_4$ or $A_xM_yXO_4$ material or particles, at least some portion, and typically a substantial portion, of the oxide component will cocrystallize in this manner. It is believed that X-ray refinement structure analysis and X-ray absorption spectroscopy show that the oxide component is not a dopant or a coating in the composite compositions described herein.

It is believed that in the composite compositions described herein comprising a Group 11 metal component, such as copper, in place of the oxide component, B, that this metal component is cocrystallized on or in the corresponding $M_yXO_4$ or $A_xM_yXO_4$ material or particles. Further, it is believed that while an excess of this metal component may form a substantially uniform rim outside the $M_yXO_4$ or $A_xM_yXO_4$ material or particles, at least some portion, and typically a substantial portion, of the metal component will cocrystallize in this manner. It is believed that such composite compositions exhibit at least some of the features or advantages described elsewhere herein.

It is believed that X-ray diffraction studies showing fine structure peaks associated with the oxide component distinguish the composite compositions described herein, such as $A_xM_yXO_4.zB$ or $A_xM_yXO_4.zB/C$, for example, from comparative materials, such as native $LiFePO_4$, $LiFePO_4/C$, or either of these comparative materials coated or doped with a metal oxide. Further, it is believed that relative to electrochemical cells employing such comparative materials, electrochemical cells employing the composite compositions described herein are generally enhanced in terms of initial charge/discharge capacity, charge/discharge capacity retention, and charge/discharge rate capability associated with electrochemical cell operation. It is believed an enhanced initial capacity may be attributed to improved capacity of the oxide component of the composite compositions, while an enhanced rate capability may be attributed to diminished cation disordering during charge and discharge cycling at low as well as high C rates.

Examples relating to the compositions described herein and associated technology, such as associated methods, for example, are provided below.

EXAMPLES

Example 1

Composite Material $Li_{1.01}Fe_{0.98}PO_4.0.012MgO/C$

Phosphoric acid (85%, 2 moles) and citric acid (0.25 mole) were mixed and dissolved in deionized water (600 ml) to form an acidic solution. After the resulting solution was thoroughly mixed, iron powder (99%, 2 moles) was added to form a mixture comprising ferric phosphate and ferrous phosphate at a temperature of about 20° C. to about 30° C. in solution. This solution was continuously stirred for 24 hours to provide complete dispersion. Triton X-100 (10 ml), a non-ionic surfactant, was then added to the dispersed solution. Lithium hydroxide monohydrate (56%, 2 moles) was added to the resulting solution while it was thoroughly stirred. A mixture comprising lithium ferric phosphate and lithium ferrous phosphate resulted.

The resulting mixture, distilled water (100 ml), and magnesium oxide (0.02 mole) were placed into a ball mill jar and thoroughly milled and dispersed therein to form a semicrystalline nanoscale particle mixture in solution. The mixture was spray-dried to form a precursor.

The precursor was placed in an aluminum oxide crucible, which was in turn placed in a furnace. Carbon powder was also placed in the furnace. The furnace was filled with an argon carrier gas. The temperature of the furnace was brought from about room temperature to 800° C. using increments of about 20° C. and maintained at 800° C. for 24 hours. In the furnace, carbon particles from the carbon powder were suspended in the argon carrier gas and mixed with the precursor to produce a composite material, $Li_{1.01}Fe_{0.98}PO_4.0.012MgO/C$, comprising a lithium iron (ferric) oxide phosphate matrix cocrystallized with magnesium oxide and an outer carbon coating. The numbers for x, y and z, namely, 1.01, 0.98 and 0.012, respectively, were determined via AES/ICP techniques. The material is an example of a material that may be simply represented by $Li(I)Fe(II)PO_4.MgO/C$ or $LiFePO_4.MgO/C$, and may be referred to simply as $Li(I)Fe(II)PO_4.MgO/C$ or $LiFePO_4.MgO/C$ herein.

Example 2

Composite Material $Li_{1.04}Fe_{0.99}PO_4.0.005TiO_2/C$

Phosphoric acid (85%, 2 moles) and citric acid (0.25 mole) were mixed and dissolved in deionized water (600 ml) to form an acidic solution. After the resulting solution was thoroughly mixed, iron powder (99%, 2 moles) was added to form a mixture comprising ferric phosphate and ferrous phosphate at a temperature of about 20° C. to about 30° C. This solution was continuously stirred for 24 hours to provide complete dispersion. Triton X-100 (10 ml), a non-ionic surfactant, was then added to the dispersed solution. Lithium hydroxide monohydrate (56%, 2 moles) was added to the resulting solution while it was thoroughly stirred. A mixture comprising lithium ferric phosphate and lithium ferrous phosphate resulted.

The resulting mixture, distilled water (100 ml), and titanium oxide (0.02 mole) were placed into a ball mill jar and thoroughly milled and dispersed therein to form a semicrystalline nanoscale particle mixture in solution. The mixture was spray-dried to form a precursor.

The precursor was placed in an aluminum oxide crucible, which was in turn placed in a furnace. Carbon powder was also placed in the furnace. The furnace was filled with an argon carrier gas. The temperature of the furnace was brought from about room temperature to 800° C. using increments of about 20° C. and maintained at 800° C. for 24 hours. In the furnace, carbon particles from the carbon powder were suspended in the argon carrier gas and mixed with the precursor to produce a composite material, $Li_{1.04}Fe_{0.99}PO_4.0.005TiO_2/C$, comprising a lithium iron (ferric) oxide phosphate matrix cocrystallized with titanium oxide and an outer carbon coating. The numbers for x, y and z, namely, 1.04, 0.99 and 0.005, respectively, were determined via AES/ICP techniques. The material is an example of a material that may be simply represented by Li(I)Fe(II)PO$_4$.TiO$_2$/C or LiFePO$_4$.TiO$_2$/C, and may be referred to simply as Li(I)Fe(II)PO$_4$.TiO$_2$/C or LiFePO$_4$.TiO$_2$/C herein.

Example 3

Composite Material Li$_{1.03}$Fe$_{0.996}$PO$_4$.0.02V$_2$O$_3$/C

Phosphoric acid (85%, 2 moles) and citric acid (0.25 mole) were mixed and dissolved in deionized water (600 ml) to form an acidic solution. After the resulting solution was thoroughly mixed, iron powder (99%, 2 moles) was added to form a mixture comprising ferric phosphate and ferrous phosphate at a temperature of about 20° C. to about 30° C. This solution was continuously stirred for 24 hours to provide complete dispersion. Triton X-100 (10 ml), a non-ionic surfactant, was then added to the dispersed solution. Lithium hydroxide monohydrate (56%, 2 moles) was added to the resulting solution while it was thoroughly stirred. A mixture comprising lithium ferric phosphate and lithium ferrous phosphate resulted.

The resulting mixture, distilled water (100 ml), and vanadium oxide (0.02 mole) were placed into a ball mill jar and thoroughly milled and dispersed therein to form a semicrystalline nanoscale particle mixture in solution. The mixture was spray-dried to form a precursor.

The precursor was placed in an aluminum oxide crucible, which was in turn placed in a furnace. Carbon powder was also placed in the furnace. The furnace was filled with an argon carrier gas. The temperature of the furnace was brought from about room temperature to 800° C. using increments of about 20° C. and maintained at 800° C. for 24 hours. In the furnace, carbon particles from the carbon powder were suspended in the argon carrier gas and mixed with the precursor to produce a composite material, Li$_{1.03}$Fe$_{0.996}$PO$_4$.0.02V$_2$O$_3$/C, comprising a lithium iron (ferric) oxide phosphate matrix cocrystallized with vanadium oxide and an outer carbon coating. The numbers for x, y and z, namely, 1.03, 0.996 and 0.02, respectively, were determined via AES/ICP techniques. The material is an example of a material that may be simply represented by Li(I)Fe(II)PO$_4$.V$_2$O$_3$/C or LiFePO$_4$.V$_2$O$_3$/C, and may be referred to simply as Li(I)Fe(II)PO$_4$ V$_2$O$_3$/C or LiFePO$_4$.V$_2$O$_3$/C herein.

Example 4

Additional Composite Materials

Other cocrystalline materials were prepared in a manner similar to that used in Examples 1-3, or a manner as described below in this Example. Such materials included those set forth in Table 1 below. For these materials listed below, the number for y is simply given as 1 merely by way of convenience. For these materials listed below, and other materials listed elsewhere herein, the number for z may be rounded to the nearest hundredth. The four materials listed below that appear in bold-face type, labeled Composite Material I (which is the composite material of Example 1), Composite Material II, Composite Material III, and Composite Material V, were used in some of the Examples discussed herein.

TABLE 1

| Cocrystalline Compositions |
| --- |
| Li$_{1.17}$FePO$_4$•0.0097 ZnO/C |
| Li$_{1.01}$FePO$_4$•0.005 ZnO/C |

TABLE 1-continued

| Cocrystalline Compositions |
| --- |
| Li$_{1.05}$FePO$_4$•0.0097 MnO/C |
| Li$_{0.93}$FePO$_4$•0.0098 MnO/C |
| Li$_{1.03}$FePO$_4$•0.015 MnO/C |
| Li$_{1.01}$FePO$_4$•0.02 MnO/C |
| Li$_{1.04}$FePO$_4$•0.03 MnO/C |
| Li$_{1.02}$FePO$_4$•0.05 MnO/C |
| Li$_{1.11}$FePO$_4$•0.013 MgO/C |
| Composite Material I: |
| Li$_{1.01}$FePO$_4$•0.012 MgO/C |
| Li$_{1.03}$FePO$_4$•0.017 MgO/C |
| Li$_{0.99}$FePO$_4$•0.021 MgO/C |
| Li$_{0.99}$FePO$_4$•0.032 MgO/C |
| Li$_{1.01}$FePO$_4$•0.05 MgO/C |
| Li$_{1.23}$FePO$_4$•0.009Al$_2$O$_3$/C |
| Li$_{1.03}$FePO$_4$•0.016 Al$_2$O$_3$/C |
| Li$_{1.08}$FePO$_4$•0.01 NiO/C |
| Li$_{1.04}$FePO$_4$•0.01 NiO/C |
| Li$_{1.03}$FePO$_4$•0.02 V$_2$O$_3$/C |
| Li$_{1.07}$FePO$_4$•0.021 V$_2$O$_3$/C |
| Li$_{0.95}$FePO$_4$•0.032 V$_2$O$_3$/C |
| Composite Material III: |
| Li$_{0.98}$FePO$_4$•0.044 V$_2$O$_3$/C |
| Li$_{1.00}$FePO$_4$•0.067 V$_2$O$_3$/C |
| Li$_{1.06}$FePO$_4$•0.098 V$_2$O$_3$/C |
| Li$_{1.12}$FePO$_4$•0.01 CoO/C |
| Li$_{0.95}$FePO$_4$•0.098 CoO/C |
| Li$_{1.11}$FePO$_4$•0.018 SiO$_2$/C |
| Composite Material V: |
| Li$_{0.96}$FePO$_4$•0.012 Cr$_2$O$_3$/C |
| Li$_{1.04}$FePO$_4$•0.0047 TiO$_2$/C |
| Li$_{1.07}$FePO$_4$•0.014 TiO$_2$/C |
| Li$_{1.04}$FePO$_4$•0.013 TiO$_2$/C |
| Composite Material II: |
| Li$_{1.03}$FePO$_4$•0.029 TiO$_2$/C |

These composite materials may be prepared in a manner similar to that used in any of Examples 1-3. Some of these composite materials have been prepared as now described, using LiOH.H$_2$O, iron powder, H$_3$PO$_4$, and an oxide component, B, as reactants. In such preparations, stoichiometric amounts of the reactants were dissolved in deionized water to which at least one surfactant was added as a complexing agent to facilitate formation of a gel. Each of the prepared solutions was sprayed-dried until fine particles were formed. In a flowing N$_2$ gas environment, the particles were heated to 400° C. to release CO$_2$ and the resulting decomposed precursor particles were further sintered at 800° C. The sintering took place in a reducing atmosphere to prevent oxidation of Fe$^{2+}$ cations.

In the preparation of Composite Material II, the theoretical amount, a mole ratio of 0.030, of the oxide component, TiO$_2$, was used in the solution prepared. The actual amount of TiO$_2$ present in Composite Material II was determined by inductively coupled plasma (ICP) analysis to be a mole ratio of 0.029. The actual amount was slightly less than the theoretical amount, indicating that some amount of the oxide component may have been lost during processing.

Additional cocrystalline composite materials were prepared in a manner similar to that used in Examples 1-3, or a manner as described in this Example, wherein the oxide component was an oxide of copper. These additional composite materials were Li$_{1.09}$FePO$_4$.0.0098Cu/C, Li$_{0.96}$FePO$_4$.0.0097Cu/C, Li$_{1.10}$FePO$_4$.0.0156Cu/C, Li$_{1.03}$FePO$_4$.0.02Cu/C, Li$_{1.04}$FePO$_4$.0.03Cu/C, and Li$_{1.03}$FePO$_4$.0.05Cu/C. The latter material, sometimes referred to herein as Composite Material IV, was used in some of the Examples discussed herein. It was initially believed that these six materials contained the oxide, CuO, but subsequent testing of the materials (carried out at the National Synchroton Radiation Research Center, Taiwan) showed that materials comprised the first row transition metal, Cu, not the oxide, CuO. It is believed that these composite materials contained a CuO component leading up to the calcination process, which component was reduced during calcination in inert gas.

X-ray diffraction patterns using Cu K radiation were obtained for various composite materials prepared to determine phase purity. High-resolution transmission electron microscopy (HRTEM) with field emission was used to study the surface morphology of powders of various composite materials. In situ X-ray absorption studies (carried out at the National Synchrotron Radiation Research Center, Taiwan), using a Mylar window to allow penetration of a synchrotron beam, were also used to characterize various composite materials. In these studies, the electron storage ring was operated at an energy of 1.5 GeV with a beam current of 100-200 mA.

X-rays may not be sensitive enough to detect various oxide components of the composite materials, such as $Cr_2O_3$ and $V_2O_3$, for example. Various Fourier transforms (FTs) of $k^3$-weighted Cr, V and Ti K-edge EXAFS measurements were performed to confirm whether various oxide components were part of cocrystalline formations of various composite materials. Various K-edge EXAFS spectra were obtained at the BL17C Wiggler beamline.

CR2032 coin cells were prepared using various composite materials and used to study the electrochemical characteristics of these batteries, including galvanostatic charge and discharge characteristics. Generally, an electrode for a coin cell was made by dispersing 85 weight percent of the active composite material, 8 weight percent carbon black, and 7 weight percent polyvinylidene fluoride (PVDF) in n-methylpyrrolidone (NMP) to form a slurry; coating the slurry onto an aluminum foil; and drying the coated aluminum electrodes in a vacuum oven, followed by pressing the electrode. Each coin cell was assembled in an argon-filled glove box (Mbraun, Unilab, Germany) using a lithium foil as a counter electrode. In the electrochemical characterization study of a given coin cell, an electrolyte of $LiPF_6$ (1 M) in a 1:1 mixture of ethylene carbonate (EC) and dimethyl carbonate (DMC) was used. In each cyclic voltammetry (CV) study, measurements were performed using an electrochemical working station at a scanning rate of 0.1 mV/s, and each cell was galvanostatically charged and discharged at a C/5 rate over a voltage range of 2.5 to 4.3 V.

This Example generally describes some of the composite compositions prepared, various methods used to prepare them, various techniques used to evaluate them, and various parameters used for those techniques. Variations as to all of these are contemplated herein. In other Examples herein the various composite compositions, methods of preparing them, techniques and parameters used to evaluate them were as more specifically described in such Examples.

Example 5

Surface Morphology, Energy Dispersive Spectroscopy Spectra, and Electron Energy Loss Spectroscopy Mapping of Composite Materials Various composite materials, namely, $Li(I)Fe(II)PO_4.Cr_2O_3/C$, $Li(I)Fe(II)PO_4.Cu/C$ and $Li(I)Fe(II)PO_4.TiO_2/C$, were prepared. During these preparations, various ions (ions of lithium, iron and phosphate, and of chromium, copper and titanium, respectively) were dissolved in an aqueous medium and mixed on the atomic scale. It is believed that these preparations resulted in compositions in which a substantially homogeneous cocrystallization of the $Cr_2O_3$, Cu, and $TiO_2$, respectively, with the olivine lattice structure.

Figure 4A:
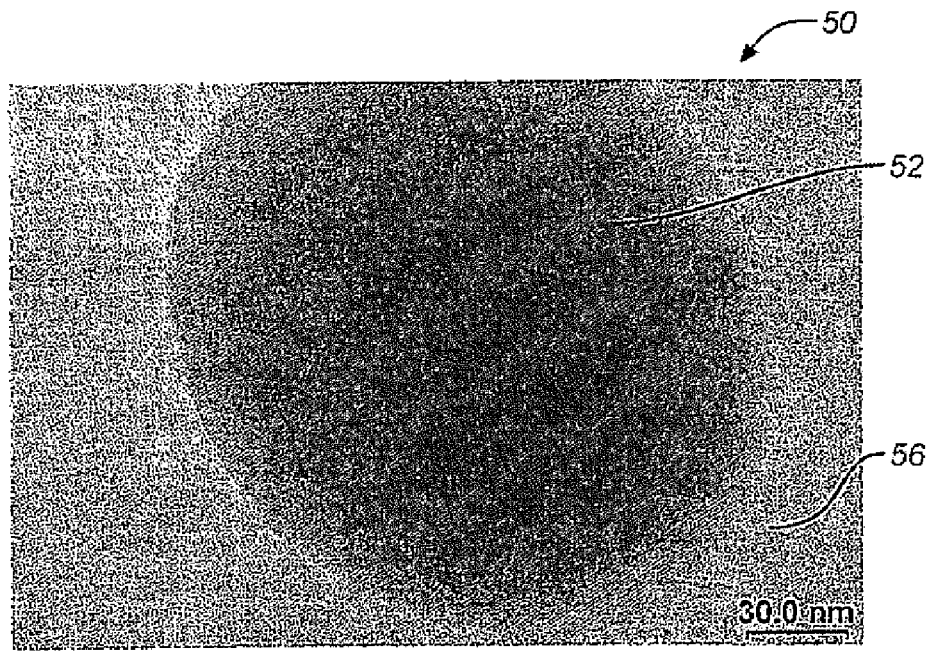
FIG. 4A, FIG. 4B, FIG. 4C and FIG. 4E are photographs showing the surface morphology of particles of three different composite materials and a comparative material, respectively, as further described in Example 5.

A photograph showing the surface morphology of a portion of a particle of the $Li(I)Fe(II)PO_4.Cr_2O_3/C$ composite material was obtained via analytical transmission electron microscope photography. The photograph appears in FIG. 4A. The line appearing in the right corner of FIG. 4A represents 30 nanometers and the magnification is 300K. It is believed that the darker portion 52 corresponds to the $Li(I)Fe(II)PO_4.Cr_2O_3$ cocrystal of the composite material 50 and the lighter or semi-transparent outer portion 56 corresponds to the carbon component of the composite material 50. Particles of the composite material were considered substantially spherical in shape. The effective diameter of the particle of the composite material was found to be nanoscale.

Figure 4B:
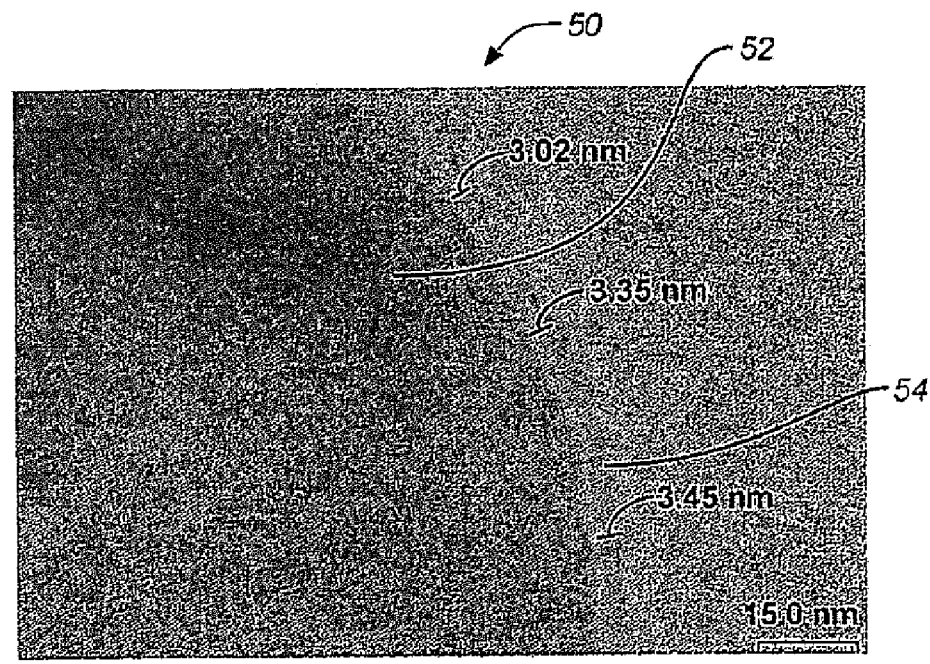

A photograph showing the surface morphology of a portion of a particle of the $Li(I)Fe(II)PO_4.Cu$ composite material was obtained via analytical transmission electron microscope photography. The photograph appears in FIG. 4B. The line appearing in the right corner of FIG. 4B represents 15 nanometers and the magnification is 600K. It is believed that the darker portion 52 corresponds to the $Li(I)Fe(II)PO_4.Cu$ cocrystal of the composite material 50 and the rim portion 54 corresponds to an excess of Cu. The thickness of the rim is shown in three places as being between about 3 nanometers and about 3.5 nanometers, namely, 3.02 nanometers, 3.35 nanometers, and 3.45 nanometers, respectively. Particles of the composite material were considered substantially spherical in shape. Both the effective diameter of the cocrystalline matrix of the particle and the thickness of the rim of the particle were found to be nanoscale.

Figure 4C:
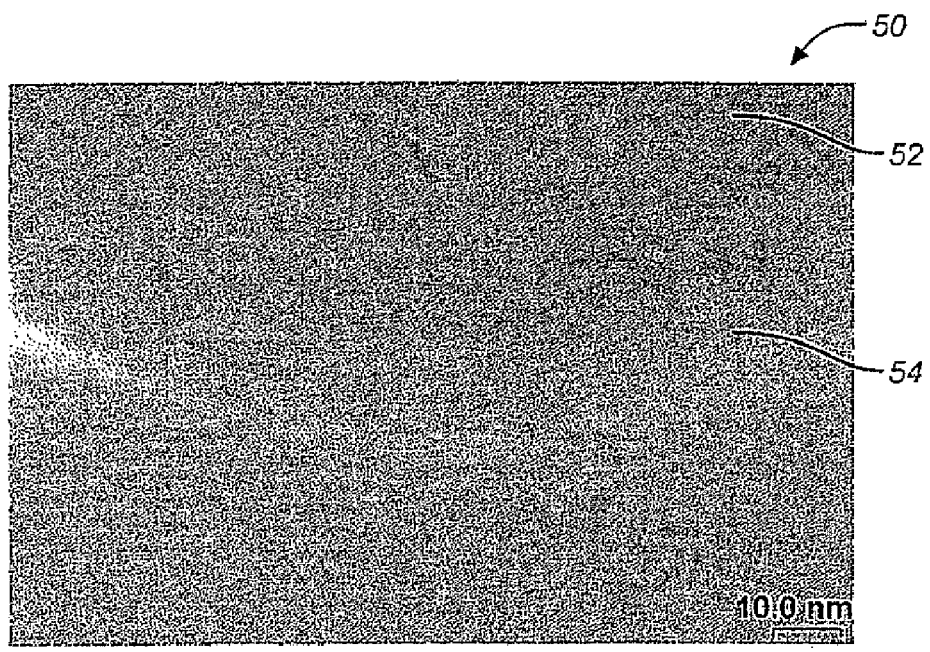

The photograph appears to show outlines that are a bit clearer than those shown in the photograph of FIG. 4C (described below) and variable features on the surface of the material. The photograph appears to show a substantially uniform Cu layer, formed from out of the core, with a thickness of between about 3 nanometers and about 3.5 nanometers. It is believed that the photograph shows Cu cocrystallized and substantially uniformly distributed in the particle of composite material, with excess Cu precipitated, but not in a disordered manner, on the surface of the particle.

A photograph showing the surface morphology of a portion of a particle of the $Li(I)Fe(II)PO_4.TiO_2$ composite material was obtained via analytical transmission electron microscope photography. The photograph appears in FIG. 4C. The line appearing in the right corner of FIG. 4C represents 10 nanometers and the magnification is 600K. It is believed that the darker portion 52 corresponds to the $Li(I)Fe(II)PO_4.TiO_2$ cocrystal of the composite material 50 and the rim portion 54 corresponds to an excess of $TiO_2$. Particles of the composite material were considered substantially spherical in shape. Both the effective diameter of the cocrystalline particle and the thickness of the rim of the particle were found to be nanoscale. It is believed that the photograph shows $TiO_2$ cocrystallized and substantially uniformly distributed in the particle of composite material, with excess $TiO_2$ precipitated, but not in a disordered manner, on the surface of the particle.

The $Li(I)Fe(II)PO_4.TiO_2/C$ composite material was subjected to energy dispersive spectroscopy (EDS). The resulting EDS spectrum (intensity (cts) vs. energy (keV)) is shown in FIG. 4D. It is believed that an analysis of the EDS spectrum shows a substantially uniform distribution of the element associated with the oxide component, here, ionic $Ti^{4+}$, on the surface of individual crystals of the cocrystalline material.

If the oxide component of a composite material described herein were merely a coating, it is believed a more disordered distribution of the oxide component on the outside of the core material would be seen in a TEM photograph such as that taken herein. Additionally, if the oxide component of a composite material described herein were merely a dopant, it is believed it would not appear in a TEM photograph such as that taken herein.

Figure 4E:
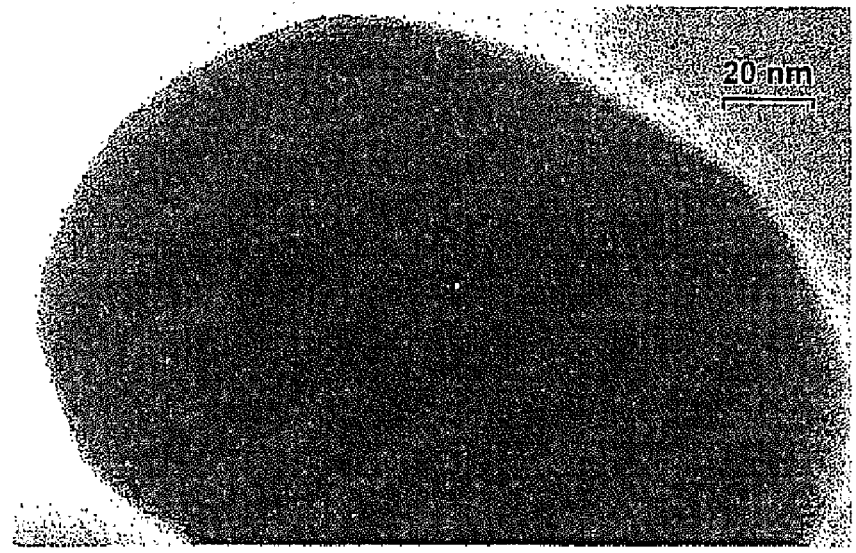
Figure 4D:
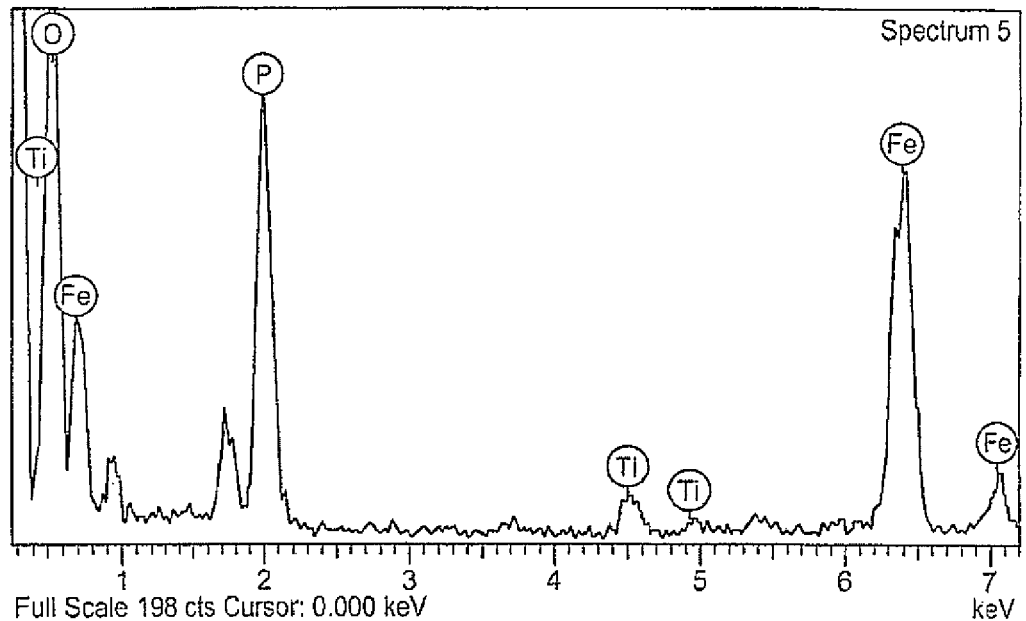
FIG. 4D is a graphical representation of an EDS spectrum of the composite material shown in FIG. 4C, as further described in Example 5. Each of FIG. 4F

A photograph showing the surface morphology of a comparative $LiFePO_4$ material that is not cocrystalline is shown in FIG. 4E. The line appearing in the right corner of FIG. 4E represents 20 nanometers and the magnification is 300K. Unlike the photographs shown in FIG. 4B and FIG. 4C, only a dark matrix can be seen in the photograph. Additionally, the photograph shows relatively clear outlines and relatively flat or uniform surfaces.

A photograph showing an electron energy loss spectroscopy (EELS) mapping of Cr in the $LiFePO_4.zCr_2O_3$ composite material is shown in FIG. 4F. The EELS mapping was carried out by the National Synchrotron Radiation Research Center in Taiwan (NSRRC) using a JEOL machine, Model JXA-8500F, which combines the techniques of TEM photography and EELS mapping. The line appearing in the left bottom corner of FIG. 4F represents 50 nanometers and the magnification is 100K. The composite material appeared to have a very homogeneous elemental distribution.

Figure 4G:
FIG. 4G is a photograph showing an electron energy loss spectroscopy (EELS) mapping concerning a composite material, as further described in Example 5.

A photograph showing an EELS mapping of Ti in the $LiFePO_4.zTiO_2$ composite material is shown in FIG. 4G. The EELS mapping was carried out by the NSRRC using a JEOL machine, Model JXA-8500F, as described above. The line appearing in the left bottom corner of FIG. 4G represents 0.1 micrometers and the magnification is 100K. The composite material appeared to have a very homogeneous elemental distribution, with a relatively small amount of the oxide components, $TiO_2$, appearing in the distribution of the material, and most of the oxide components appearing on the surface of the material.

It is believed that the photographs of the cocrystalline composite materials show that the oxide components, B, are distributed in the olivine structural phase of the material. It is further believed that these photographs show that an excess of oxide components may be precipitated, but not in a disordered manner, on the surface of the olivine-structured material. It is believed that these results may show the presence of these oxide components in or on the olivine structure.

Example 6

Diffraction Patterns and Structural Parameters of Composite Materials

The diffraction pattern associated with a powder of Composite Material I was obtained via a powder X-ray difractometer, using monochromatized Cu Kα radiation, a scan rate of 0.1 degrees per 10 seconds, and an axis of 2θ in a range from 10 to 50 degrees. The same procedure was followed separately for each of Composite Material II and Composite Material III. While these diffraction patterns are not shown, diffraction patterns obtained in connection with a $Li(I)Fe(II)PO_4.TiO_2/C$ composite material, Composite Material II, another composite material, $Li(I)Fe(I)PO_4.Cu/C$, Composite Material IV, and a comparative material, are described in connection with Example 9 and shown in FIG. 6.

A computer program (CellRef Lattice Refinement Routine) (see www.ccp13.ac.uk/software/Unsupported/cellref-.html.) was used to refine the results to determine structural parameters of each of Composite Material I, Composite Material II, and Composite Material III. Structural or lattice parameters associated with these composite materials were determined via the Reitveld refinement method and appear in Table 2 below.

TABLE 2

| Lattice Parameters Associated with Composite Materials | | | |
|---|---|---|---|
| Composite Material | Composite Material I | Composite Material II | Composite Material III |
| a [Å] | 10.3508 | 10.3410 | 10.3563 |
| b [Å] | 6.0144 | 6.0203 | 6.0160 |
| c [Å] | 4.6979 | 4.6956 | 4.6934 |
| α, β, γ [deg] | 90 | 90 | 90 |
| V [Å³] | 292.5 | 292.3 | 292.4 |

By way of comparison, various lattice parameters associated with $LiFePO_4$ have been reported as follows: a = 10.334 Å; b = 6.008 Å; c = 4.693 Å; and V = 291.392 Å³, by A. K. Padhi et al., J. Electrochem. Soc. 144, 1188 (1997), and a = 10.328 Å; b = 6.009 Å; c = 4.694 Å; and V = 291.31 Å³, in Electrochimica Acta 50, 2955-2958 (2005).

It is believed these results demonstrate the cocrystalline structure of the $Li(I)Fe(II)PO_4$ portion and the MgO portion of Composite Material I, the $TiO_2$ portion of Composite Material II, and the $V_2O_3$ portion of Composite Material III, respectively. It is believed that each of these cocrystalline structures comprise an ordered olivine structure indexed to the orthorhombic Pmna space group. It is further believed that as each oxide component, here, MgO, $TiO_2$, and $V_2O_3$ in Composite Materials I, II, and III, respectively, is used in low concentration, it does not destroy the lattice structure associated with the $LiFePO_4$ portion of the material. It is further believed that as the ion radius of each non-oxygen element of the oxide, here, Mg, Ti, and V in Composite Materials I, II, and III, respectively, is somewhat similar to that of the ferrous ion of the $LiFePO_4$ portion of the material, the distortion of the lattice structure associated with the $LiFePO_4$ portion of the material is slight or negligible. Nonetheless, the lattice structure of the cocrystalline material is different from that of the lattice structure of $LiFePO_4$, as demonstrated above.

Example 7

Cyclic Voltammograms of Composite Materials

Figure 5A:
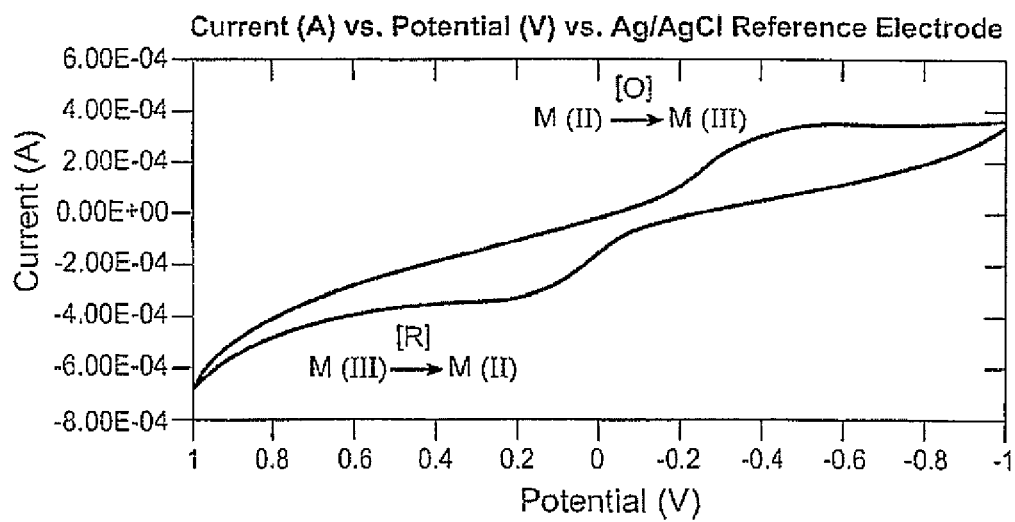
FIG. 5A and FIG. 5B are graphical representations of cyclic voltammograms obtained in connection with Example 7, as further described herein.

Cyclic Voltage Electric Potential Scanning was used to evaluate ion conductivity of various materials, as now described. A starting material, a $LiFe(II)PO_4.ZnO/C$ composite material, was made using an appropriate oxide material, here ZnO. The starting material was placed in an aqueous solution of $LiNO_3$ (3M), in the presence of an Ag/AgCl reference electrode, at room temperature. An ion-extraction process or de-intercalation process involving ionic lithium resulted in the oxidation of the iron center from Fe(II) to Fe(III), which was associated with a potential of 3.0 V. An ion-insertion process or intercalation process involving ionic lithium resulted in the reduction of the iron center from Fe(III) to Fe(I), which was associated with a potential of 3.6 V. A graphical representation of a cyclic voltammogram (current (A) vs. potential (V) vs. Ag/AgCl reference electrode) corresponding to the foregoing is shown in FIG. 5A and a representation of the reaction schemes corresponding to the foregoing is shown below.

Figure 5B:
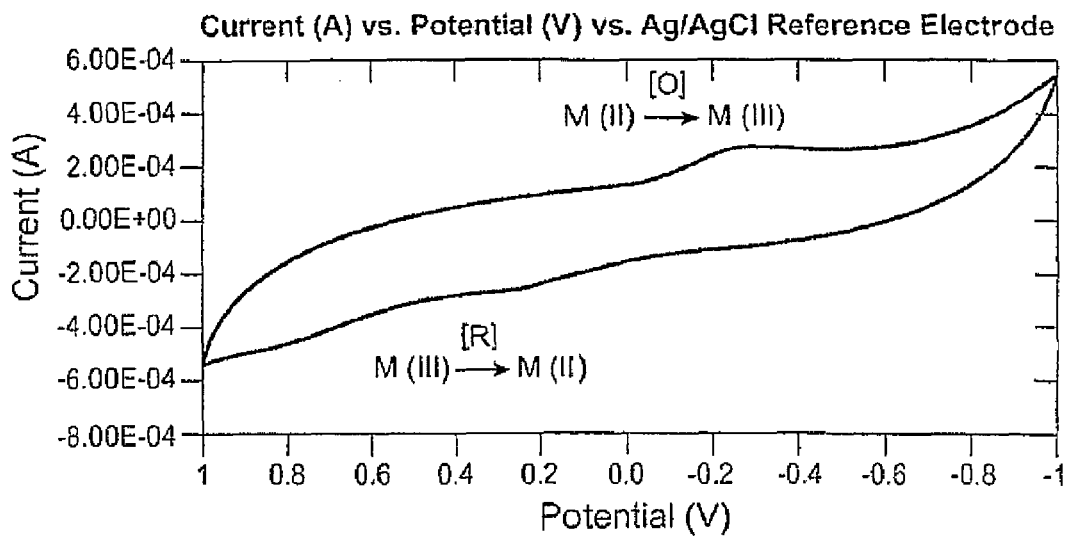

A starting material, a Fe(III)PO$_4$.TiO$_2$/C composite material, was made using an appropriate oxide component, here TiO$_2$, and omitting an A-comprising component, such as a lithium-comprising component or lithium chloride or LiOH.H$_2$O, for example. The starting material was placed in an aqueous solution of LiNO$_3$ (3M) in the presence of an Ag/AgCl reference electrode at room temperature. An ion-insertion process or intercalation process involving ionic lithium resulted in the reduction of the iron center from Fe(III) to Fe(II), which was associated with a potential of 3.02 V. An ion-extraction process or de-intercalation process involving ionic lithium resulted in the oxidation of the iron center from Fe(II) to Fe(III), which was associated with a potential of 3.5 V. A graphical representation of a cyclic voltammogram corresponding to the foregoing is shown in FIG. 5B (current (A) vs. potential (V) vs. Ag/AgCl reference electrode) and a representation of the reaction schemes corresponding to the foregoing is shown below.

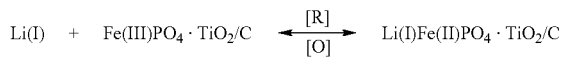

In this particular example, the reaction involved Fe(III)PO$_4$.0.03TiO$_2$/C as a starting material and produced Li(I)$_{1.03}$Fe(II)PO$_4$.0.029TiO$_2$/C, Composite Material II, as an ending material in the ion-insertion process. (See Example 4 regarding differences between theoretical amounts of the oxide component (here 0.03TiO$_2$) used in the preparation process and actual amounts (here 0.029 TiO$_2$) determined by ICP analysis in the product of the process.)

It is believed that the foregoing demonstrates the ionic conductivity of a LiFePO$_4$.ZnO/C cocrystalline composite material and corresponding FePO$_4$.ZnO/C cocrystalline composite material; and a LiFePO$_4$.TiO$_2$/C cocrystalline composite material and corresponding FePO$_4$.TiO$_2$/C cocrystalline composite material. It is believed that the redox center of the LiFe(II)PO$_4$ portion of the material, in these examples, iron, is involved in reduction and oxidation processes, while the subject of the oxide of the remaining ZnO or TiO$_2$ portion of the material, respectively, in these examples, zinc or titanium, respectively, is not involved in such processes. The reduction and oxidation processes induce a high open-circuit voltage (OCV) of the Fe$^{2+}$/Fe$^{3+}$ redox relative to the Fermi level of lithium. It is believed that the small amount of the oxide component in the cocrystalline material, such as ZnO or TiO$_2$, for example, does not affect or significantly affect the OCV associated with the cocrystalline composite materials described herein, which is mainly determined by a polyanion of the cocrystalline material, such as PO$_4^{3-}$, for example.

As described above in connection with Example 6, the lattice parameters associated with a [Li(I)Fe(II)PO$_4$.TiO$_2$]/C composite material differ from that associated with a LiFePO$_4$ composition.

Example 8

Electrochemical Reversible Half-Cells Comprising Composite Materials and Performance Thereof The composite material from Example 1, namely, Composite Material I, was mixed with carbon black and polyvinylidene difluoride (PVDF) in a weight ratio of 80:10:10 in N-methyl-pyrrolidone (NMP) solvent (1 ml). The resulting mixture was coated on aluminum foil and dried at 120° C. to form a positive electrode test specimen having a thickness of 150 mm. The positive electrode test specimen was combined with a lithium negative electrode to form a coin-type electrochemical reversible half-cell. The same procedure was followed separately for each of the composite materials from Example 2 and Example 3, with the exception that the composite material from Example 1 was replaced with the composite material from Example 2 and the composite material from Example 3, respectively.

Each of the coin-type electrochemical reversible half-cells described above was tested to determine associated charge and discharge characteristics over several charge-discharge cycles at room temperature. The following parameters were used: an applied charge voltage and an applied discharge voltage, each in the range from 2.5 V to 4.3 V; a charge rate and discharge rate, each set to C/5; and room temperature conditions. The following characteristics were determined: charge capacity (mAh/g) and discharge capacity (mAh/g) associated with a first charge-discharge cycle and a tenth charge discharge cycle, respectively. The results associated with each of the coin-type electrochemical reversible half-cell described above are shown in Table 3 below.

TABLE 3

Charge Capacities Associated with Half-Cells using Composite Materials

| Composite Material of Half-Cell | 1st Charge Capacity (mAh/g) | 1st Discharge Capacity (mAh/g) | 10th Charge Capacity (mAh/g) | 10th Discharge Capacity (mAh/g) |
|---|---|---|---|---|
| Composite Material of Example 1 | 131 | 131 | 133 | 132 |
| Composite Material of Example 2 | 168 | 144 | 147 | 146 |
| Composite Material of Example 3 | 165 | 141 | 145 | 143 |

As shown, for one of the half-cells, the specific capacity associated with the initial discharge reached reach about 144 mAh/g, while the specific capacity associated with the tenth discharge reached about 146 mAh/g. The results demonstrate that an electrochemical reversible half-cell employing a composite material described herein exhibits good charge-discharge performance and good charge-discharge cycle stability.

Example 9

Diffraction Patterns and Structural Parameters of Composite Materials

Figure 6:
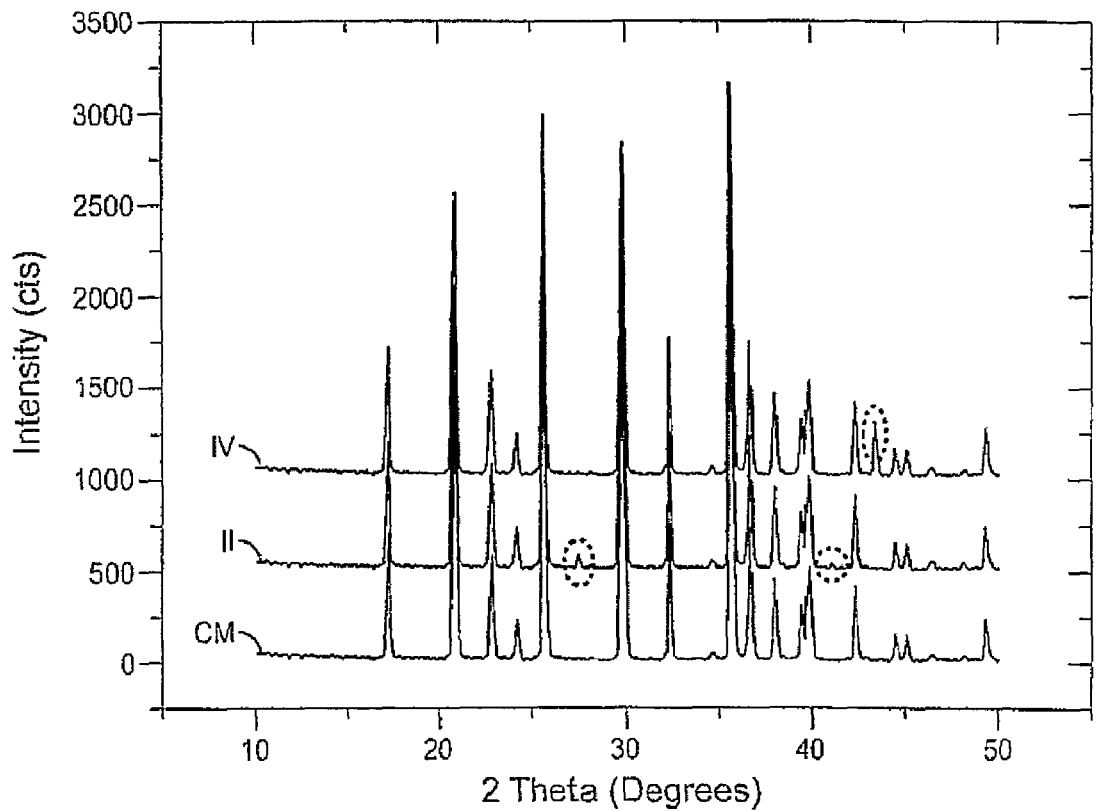
FIG. 6 is a graphical representation of diffraction patterns obtained in connection with two composite materials and a comparative material, as further described in Example 9.

A Li(I)Fe(II)PO$_4$.TiO$_2$/C composite material, namely, Composite Material II, and a Li(I)Fe(II)PO$_4$.Cu/C composite material, namely, Composite Material IV, were obtained as previously described in connection with Example 4. For each of these composite materials, the diffraction pattern associated with a powder of the composite material was obtained via a powder X-ray difractometer, using monochromatized Cu Kα radiation, a testing scan rate of 0.1 degree per 10 seconds, an axis of 2θ in a range from 10 to 50 degrees, and a temperature of 300 K, Diffraction lines of each of the composite materials were indexed to an orthorhombic crystal structure. A computer program was used to refine the results to determine structural parameters of the composite material. The diffraction pattern (intensity (cts) vs. 2θ (degrees)) obtained in connection with the each of these composite materials appears in graphical form in FIG. 6, along with that associated with a comparative material, a native (undoped) LiFePO$_4$/C. The three circled portions appearing in FIG. 6 show differences in the patterns associated with Composite Materials II and IV (shown as "II" and "IV", respectively, in FIG. 6) relative to the pattern associated with the comparative material (shown as "CM" in FIG. 6).

Each of the respective patterns associated with Li(I)Fe(II) PO$_4$.TiO$_2$/C and Li(I)Fe(II) PO$_4$.Cu/C has sharp, well-defined Bragg peaks, indicative of the presence of a pure crystalline phase. Each of these patterns shows no peak that might be associated with the carbon component of each of the materials, respectively, and no peak that might be associated with impurities. It is believed that each of these patterns evidences the formation of a cocrystalline structure with micro changes occurring in a 2θ range of from 10 to 50 degrees. In the former case, the pattern evidences triphylite Li(I)Fe(II)PO$_4$ and the metal oxide TiO$_2$ in a cocrystalline phase, with fine structure rutile TiO$_2$ positioned at 2θ of about 27 degrees and about 41 degrees. In the latter case, the pattern evidences triphylite Li(I)Fe(II)PO$_4$ and the metal Cu in a cocrystalline phase, with fine structure Cu positioned at 2θ of about 43 degrees. Each of these patterns differs from that associated with LiFePO$_4$/C. As described above in connection with Example 6, the lattice parameters associated with a Li(I)Fe(II)PO$_4$.TiO$_2$/C composite material differs from that associated with associated with a LiFePO$_4$ composition.

In metal oxide-coated LiCoO$_2$, peaks associated with the metal oxide have been reported as showing the distribution of the metal oxide in the LiCoO$_2$ material. *Electrochemical and Solid-State Letters* 6, A221-A224 (2003); *Angew. Chem. Int. Ed.* 40, 3367 (2001). An XRD pattern for LiCoO$_2$ coated with zirconium oxide has shown dominant peaks associated with LiCoO$_2$ and a small broad peak positioned at 2θ of about 30 degrees. *Electrochemical and Solid-State Letters* 6, A221-A224 (2003). It is believed that a small broad peak such as this is indicative of an oxide component, here, zirconium oxide, that exists as a coating around the LiCoO$_2$ material. It is believed a small broad peak such as this is distinguishable from the fine structure peaks discussed above in relation to two composite materials. The fine structure peaks associated with the two composite materials are believed to be indicative of a cocrystalline composite material comprising a nanocrystalline metal oxide component, TiO$_2$, or a metal component, Cu, respectively.

Structural or lattice parameters associated with the two composite materials and the comparative material, were determined via the Reitveld refinement method using a General Structure Analysis System (GSAS) (see ncnr.nist.gov/programs/crystallography/software/gsas.html) and appear in Tables 4-6, respectively, below. In these three tables, the x, y and z parameters refer to the three-dimensional Cartesian coordinates.

TABLE 4

Structural Parameters Associated with Composite Material II

| Atoms | x | y | z | Occupancy | $U_{iso}$(Å$^2$) | Interatomic distances(Å) | |
|---|---|---|---|---|---|---|---|
| Li | 0 | 0 | 0 | 1 | 0.0446 | Fe—O(1) × 1 | 2.2028 |
|   |   |   |   |   |   | Fe—O(2) × 1 | 2.1097 |
| Fe | 0.281950 | 0.25 | 0.974278 | 1 | 0.02324 | Fe—O(3) × 2 | 2.26258 |
|   |   |   |   |   |   | Fe—O(3) × 2 | 2.0791 |
| P | 0.094191 | 0.25 | 0.418392 | 1 | 0.02347 | Fe—O average | 2.163545 |
| O(1) | 0.097353 | 0.25 | 0.742852 | 1 | 0.02222 | P—O(1) × 1 | 1.5295 |
|   |   |   |   |   |   | P—O(2) × 1 | 1.56670 |
| O(2) | 0.454857 | 0.25 | 0.210292 | 1 | 0.02406 | P—O(3) × 2 | 1.56072 |
| O(3) | 0.164126 | 0.046604 | 0.283358 | 1 | 0.02415 | P—O average | 1.552307 |
| Space group: Pnma (orthorhombic) | | | | Reliability factors: $R_p$ = 2.95%; $R_{wp}$ = 4.28%; $\chi^2$ = 1.158 | | | |
| Unit cell parameters: a = 10.367494 Å; | | | | Bond angles (degress) O(2)—Fe(1)—O(3) | | | 89.983 |
| b = 6.031734 Å; c = 4.713031 Å | | | | | | O(3)—Fe(1)—O(3) | 118.738 |

TABLE 5

Structural Parameters Associated with Composite Material IV

| Atoms | x | y | z | Occupancy | $U_{iso}$(Å$^2$) | Interatomic distances(Å) | |
|---|---|---|---|---|---|---|---|
| Li | 0 | 0 | 0 | 1 | 0.04098 | Fe—O(1) × 1 | 2.20872 |
|   |   |   |   |   |   | Fe—O(2) × 1 | 2.07320 |
| Fe | 0.281418 | 0.25 | 0.973963 | 1 | 0.01948 | Fe—O(3) × 2 | 2.25349 |
|   |   |   |   |   |   | Fe—O(3) × 2 | 2.06754 |
| P | 0.095765 | 0.25 | 0.417908 | 1 | 0.02332 | Fe—O average | 2.15073 |
| O(1) | 0.095146 | 0.25 | 0.741751 | 1 | 0.02216 | P—O(1) × 1 | 1.51809 |
|   |   |   |   |   |   | P—O(2) × 1 | 1.57353 |
| O(2) | 0.453422 | 0.25 | 0.202606 | 1 | 0.0228 | P—O(3) × 2 | 1.53910 |
| O(3) | 0.164024 | 0.046907 | 0.285033 | 1 | 0.02321 | P—O average | 1.543573 |
| Space group: Pnma (orthorhombic) | | | | Reliability factors: $R_p$ = 4.07%; $R_{wp}$ = 7.15%; $\chi^2$ = 2.963 | | | |
| Unit cell parameters: a = 10.31746 Å; | | | | Bond angles (degress) O(2)—Fe(1)—O(3) | | | 89.336 |
| b = 5.999946 Å; c = 4.687699 Å | | | | | | O(3)—Fe(1)—O(3) | 118.997 |

TABLE 6

Structural Parameters Associated with Comparative Material of Native LiFePO$_4$/C

| Atoms | x | y | z | Occupancy | $U_{iso}$(Å$^2$) | Interatomic distances(Å) | |
|---|---|---|---|---|---|---|---|
| Li | 0 | 0 | 0 | 1 | 0.03751 | Fe—O(1) × 1 | 2.19655 |
|  |  |  |  |  |  | Fe—O(2) × 1 | 2.09911 |
| Fe | 0.28289 | 0.25 | 0.974445 | 1 | 0.02222 | Fe—O(3) × 2 | 2.24855 |
|  |  |  |  |  |  | Fe—O(3) × 2 | 2.06275 |
| P | 0.095108 | 0.25 | 0.418506 | 1 | 0.021532 | Fe—O average | 2.15174 |
| O(1) | 0.095108 | 0.25 | 0.744203 | 1 | 0.021536 | P—O(1) × 1 | 1.52295 |
|  |  |  |  |  |  | P—O(2) × 1 | 1.54701 |
| O(2) | 0.456303 | 0.25 | 0.209478 | 1 | 0.02002 | P—O(3) × 2 | 1.53878 |
| O(3) | 0.163637 | 0.046879 | 0.283875 | 1 | 0.283875 | P—O average | 1.53624 |

Space group: Pnma (orthorhombic); Reliability factors: $R_p$ = 3.24%; $R_{wp}$ = 4.77; $\chi^2$ = 1.612
Unit cell parameters: a = 10.2775 Å; b = 5.9802 Å; c = 4.6758 Å
Bond angles (degrees): O(2)—Fe(1)—O(3) 89.806; O(3)—Fe(1)—O(3) 118.79

As shown in Tables 4 and 5, the occupancy of the iron site in each of the two composite materials was determined to be 1, which is close to the stoichiometric index of iron in the formula for the cocrystallized material. Attempts to include Ti and Cu, respectively, in the refinements were unsuccessful, as the values obtained were much higher than the actual content of Ti and Cu, respectively, in the material sample. If a composite material were doped with a metal oxide, the occupancy of the iron site would be expected to be less than 1. It is believed that the occupancy data for the two composite materials is indicative of a composite material in which the metal oxide component, TiO$_2$, or metal component, Cu, respectively, is not present as a dopant.

As shown in Tables 4-6, the lattice parameters associated with the composite materials differ from those associated with the comparative material. It is believed that these differences may be attributed to the presence of the oxide component, B, or the metal component, Cu, respectively, in the cocrystalline material. No such component is present in the comparative material, which is not cocrystalline.

The Fe—O distances associated with the two composite materials and the comparative material as also shown in Tables 4-6. In the two composite materials, each M-centered (here, Fe-centered) octahedral structure is connected to four other M-centered octahedral structures and to four X-centered (here, P-centered) tetrahedral structures, with some octahedral-tetrahedral sharing of oxygen atoms, as previously described in connection with FIG. 3A. The central M and the central P atoms thus share a common nearest neighbor O atom along an M-O—X (here, Fe—O—P) linkage. It is believed that relative to a covalent bond associated with an M-O linkage, the covalent bond between M and O in an M-O—X linkage is weaker by virtue of the inductive effect of the M-O—X linkage and electrostatic repulsion between M and X. It is believed that this induces a high open-circuit voltage (OCV) associated with the M-based redox pair (here, Fe$^{2+}$/Fe$^{3+}$) with respect to the Fermi level of the A component (here, lithium). It is believed that this OCV is relatively undisturbed or unchanged by virtue of the presence of the oxide component, B, or the metal component, Cu, respectively, in the cocrystal of the composite materials.

Example 10

Structural Analyses of Composite Materials and Comparative Material

Figure 7:
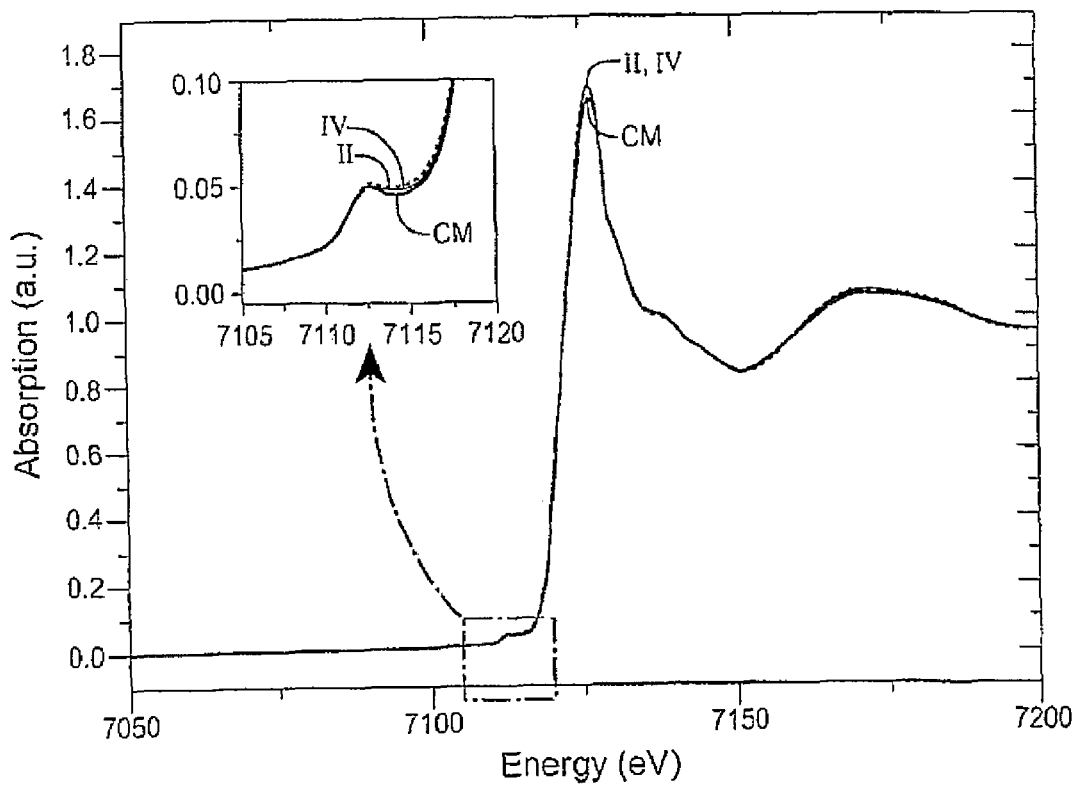
FIG. 7 is a graphical representation of X-ray absorption spectra (absorption vs. energy (eV)) obtained in connection with two composite materials and a comparative material, an enlarged portion of which appears in an inset, as further described in Example 10.

Composite Material II, Composite Material IV, and a comparative material, native LiFePO$_4$/C, were analyzed using Fe K-edge Extended X-ray Absorption Fine Structure (EXAFS) spectroscopy. The resulting spectra (absorption (a.u.) vs. energy (eV)) are shown in FIG. 7 (where Composite Materials II and IV and the comparative material are shown as "II", "IV" and "CM", respectively), with a magnified section of the spectra shown in an inset. The Fe K-edge EXAFS spectra comprised two main parts, a pre-edge region and a main edge region. In connection with each of the materials analyzed herein, a peak of the pre-edge region was considered the most useful characteristic for determining the Fe oxidation state and coordination environment. This peak was located on the lower energy side of a sharply rising absorption edge, corresponding to the 1s to 3d electronic transition, and represented the 1s to 3d quadrapolar electronic transition. This transition is typically a dipole forbidden process, although in connection with the composite materials herein it became partially allowed by virtue of the mixing of d-states of Fe with the p-states of surrounding oxygen atoms and the deviation of the ionic Fe coordination geometry from an ideal octahedral geometry. The energies associated with the pre-edge peak were sensitive to the Fe oxidation state. The intensities associated with the pre-edge peak were sensitive to site centrosymmetry, and the most centrosymmetric Fe coordination geometries were associated with the lowest intensities. The intensity minima of the pre-edge peaks were associated with octahedral symmetry and the intensity maxima of the pre-edge peaks were associated with tetrahedral coordination.

As shown in FIG. 7, the pre-edge intensity peak of the two composite materials and the comparative material was associated with an energy of over about 7110 eV. As this is the same energy that has been observed for Fe$^{2+}$, it is believed that the valence of Fe in the bulk of these materials is +2. No variation in the energies or the absorption intensities of these pre-edge peaks was associated with the presence of the oxide component, B, or the metal component, Cu, respectively, in the two composite materials. It is believed that the trace amount of these components cause little or relatively insignificant disturbance in the valence state of Fe in the two composite materials.

As also shown in FIG. 7, the intensities of the absorption peak corresponding to about 7125 eV were higher for the two composite materials than for the comparative material. The following is believed to be the case when a relative comparison of the spectra for the two composite materials and the comparative material is made. It is believed the higher intensities associated with the two composite materials reflect the increased number of unoccupied d-states for ionic Fe in the surface layer of the LiFePO$_4$ particles in the two composite materials. Further, it is believed that the oxide component, B, or the metal component, Cu, respectively, of the two cocrystallized composite materials may more easily attract 3d electrons from $Fe^{2+}$ thereby creating holes in the 3d states of these ions and inducing increased p-type conductivity in the two composite materials.

Figure 8:
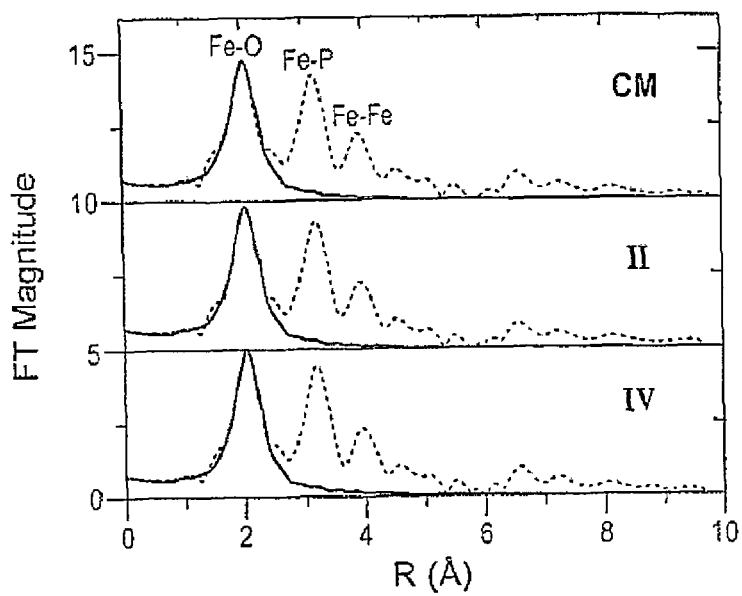
FIG. 8 is a graphical representation of radial structure function (FT magnitude) as a function of the interatomic distance, R (Å), obtained in connection with two composite materials and a comparative material, including a graphical representation of theoretical results of an FEFF fit analysis of $LiFePO_4$ (showing a first peak only), as further described in Example 10.

Each of the Fe K-edge EXAFS spectra were processed using standard corrections, including background subtraction, energy calibration, normalization, and data weighting with $k^3$ for the different states, resulting in the $k^3\Omega(k)$ function. For comparison purposes, the three spectra were fit to the EXAFS spectra generated for the two composite materials and the comparative material, respectively, using standard scattering paths. For each of the two composite materials and the comparative material, Fourier transformation of $k^3\Omega(k)$ over the limited k-space range of between zero and 15 $Å^{-1}$ was performed to provide the corresponding radial structure function (FT magnitude) as a function of the interatomic distance, R (Å), as graphically shown in FIG. 8 (where Composite Materials II and IV and the comparative material are shown as "II", "IV" and "CM", respectively). A graphical representation of theoretical results of an FEFF fit analysis of an Fe—O environment (showing a first peak only) using all possible scattering paths is also shown in FIG. 8. For each of the three materials, the radial structure function showed two strong peaks followed by two weaker peaks as the interatomic distance increased. The interatomic distances associated with the peaks were close to the radii of the back-scattering protective shells. For each of the three materials, the first three peaks corresponding to interatomic distances of up to about 4.1 Å were quantitatively analyzed using the theoretical results of the FEFF fit analysis of LiFePO$_4$ using all possible scattering paths. The coordination atoms of the first protective shell, the second protective shell, and the third protective shell were determined to be oxygen, phosphorus and iron, respectively.

An FEFF fit analysis was carried out for each of the two composite materials and the comparative material using all possible scattering paths, resulting in the structural parameters set forth in Table 7 below, wherein $Z_a$-$Z_b$ represents the central absorber and the scattering atom (or path) correlation, CN is the coordination number, R is the interatomic distance, $\sigma^2$ represents the Debye-Waller disorder parameter, and the reduction factor is 6/5.0315.

TABLE 7

FEFF Fit Analysis Data for Composite Materials and Comparative Material

| Material | $Z_a$-$Z_b$ | CN | R(Å) | $\sigma^2(Å^2 10^{-2})$ |
|---|---|---|---|---|
| Composite Material II | Fe—O | 5.1766 | 2.0804 | 1.124 |
| Composite Material IV | Fe—O | 5.1287 | 2.0830 | 1.076 |
| Comparative Material | Fe—O | 5.0815 | 2.0830 | 1.142 |

The best fit of the first protective shell was obtained by assuming interatomic Fe—O distances shown in Table 7. In the literature, best fit data for LiFePO$_4$ has been obtained by assuming three different Fe—O distances of 1.9912 Å, 2.1223 Å and 2.2645 Å, respectively. See *Electrochimica Acta* 50, 5200-5207 (2005). A comparison of the data for the two composite materials and the comparative material shows relatively subtle changes, such as very slight structural rearrangement, and minimal change in Fe—O coordination and interatomic Fe—O distance, as shown in Table 7.

It is believed that the results of this Example demonstrate that each of the oxide component, B, and the metal component, Cu, respectively, of the two composite materials cocrystallized with LiFePO$_4$ component, rather than coated and/or doped the LiFePO$_4$ component. Generally, when a native LiFePO$_4$ material is doped, some $Fe^{2+}$-associated characteristics and the interatomic distance associated with the first peak of the radial structure function will be different or shifted relative to those associated with the native material. The results of the EXAFS spectra showed that the energies of the $Fe^2$-associated pre-edge peaks of the two composite materials and the comparative material were substantially the same. These results showed that the that the absorption intensities of the $Fe^{2+}$-associated pre-edge peaks of the two composite materials and the comparative material differed only slightly, and not sufficiently to indicate a significant disturbance in the oxidation state of Fe. The results of the radial structure function determinations showed that the interatomic distances associated with the first peaks of the functions for the two composite materials and the comparative material were substantially the same. A comparison of the data for the two composite materials and the comparative material showed relatively subtle changes, such as very slight structural rearrangement, and minimal change in Fe—O coordination and interatomic Fe—O distance.

Example 11

Structural Analyses of Composite Material and Comparative Material

Composite Material V and a comparative material, $Cr_2O_3$ with a Cr oxidation state of 3+, were analyzed using Cr K-edge Extended X-ray Absorption Fine Structure (EXAFS) spectroscopy. Each of the Cr K-edge EXAFS spectra were processed using IFEFFIT based program packages (see B. Ravel, et al., *J. Synchrotron Radiat.* 12, 537 (2005)) and FEFF6 code (see J. J. Rehr et al., *Phys. Rev. Lett.* 69, 3397 (1992)), with photoelectron scattering paths calculated ab initio from a presumed distribution of neighbor atoms. The resulting spectra (absorption (a.u.) vs. energy (eV), not shown) were obtained, wherein the energy scale was relative to the energy of the Cr K-edge in metal (5989.0 eV). The peaks of the pre-edge regions for both materials were almost the same, indicating that the average oxidation state of chromium in the composite material was predominantly 3+.

Each of the Cr K-edge EXAFS spectra were processed in a similar manner to that described above in connection with Example 10. For each of the composite material and the comparative material, Fourier transformation of $k^3\Omega(k)$ over the limited k-space range of between 3.6 $Å^{-1}$ and 13.5 $Å^{-1}$ was performed to provide the corresponding radial structure function (FT magnitude) as a function of the interatomic distance, R (Å), as graphically shown in FIG. 9 (where Composite Material V and comparative material are shown as "V" and "CM", respectively). A graphical representation of theoretical results of an FEFF fit analysis of the composite material and the comparative material is also shown in FIG. 9 (where the fit for Composite Material V and the fit for comparative material are shown as "V fit" and "CM fit", respectively).

As to the composite material, the spectrum shows three prominent peaks representing contributions of the nearest coordination protective shells of neighbors of the Cr atom. As to the comparative material, which has a trigonal crystal structure, the spectrum shows three prominent peaks representing contributions of the nearest coordination protective shells of neighbors of the Cr atom in the radius below 4 Å (see C. Engemann, et al., *Chemical Phys.* 237, 471 (1998)). The first peaks of these spectra, representing contributions of the coordination protective shell nearest the Cr atom, are quite similar. Strong peaks characteristic of more distant protective shells are absent in both spectra. It is believed that the results demonstrate that the Cr of the composite material is predominantly in the form of crystalline $Cr_2O_3$.

In a $Cr_2O_3$ crystal structure, the Cr atom is octahedrally coordinated to six oxygen atoms (three at 1.96 Å and three at 2.01 Å) in the first coordination protective shell and four Cr atoms (one at 2.65 Å and three at 2.88 Å) in the second coordination protective shell, and has further alternate protective shells of oxygen and Cr neighbors. An FEFF fit analysis was carried out for the composite material and the comparative material using all single and significant multiple scattering paths up to 4.0 Å, resulting in the structural parameters set forth in Table 8 below, wherein $Z_a$-$Z_b$ represents the central absorber and the scattering atom (or path) correlation, CN is the coordination number, R is the interatomic distance, $\sigma^2$ represents the Debye-Waller disorder parameter, and the reduction factor is 6/5.0315.

TABLE 8

FEFF Fit Analysis Data for Composite Material and Comparative Material

| Material | $Z_a$-$Z_b$ | CN | R(Å) | $\sigma^2(\text{Å}^2 10^{-2})$ |
|---|---|---|---|---|
| Composite Material V | Cr—O | 4.4274 | 1.9857 | 1.142 |
| Comparative Material | Cr—O | 4.7297 | 1.9876 | 3.765 |

A good fit between the EXAFS spectra of the composite material and the comparative material was obtained in the k-space range of between 3.6 Å$^{-1}$ and 13.5 Å$^{-1}$ at a R in the region of up to over 2 Å, particularly around 1.98 Å, as shown in FIG. 9. A good fit between the FEFF fit analysis data for the composite material and the comparative material was obtained, the former showing six oxygen atoms at a distance of 1.9857 Å, as shown in Table 8.

It is believed that the results of this example are consistent with the conclusion that the central Cr of the composite material is closer to an ideal octahedral $CrO_6$ structure than is the central Cr of the comparative material.

Example 12

Structural Analyses of Composite Material and Comparative Materials

Composite Material III and three comparative materials, $V_2O_3$, $VO_2$ and $V_2O_5$, were analyzed using V K-edge Extended X-ray Absorption Fine Structure (EXAFS) to characterize the cocrystalline structure. The resulting spectra (absorption (a.u.) vs. energy (eV), not shown) were obtained, wherein the energy scale was relative to the energy of the V K-edge in metal (5465.0 eV). The peaks of the pre-edge regions for both materials were almost the same, indicating that the average valence state of vanadium in the composite material was predominantly 3+.

As to the composite material, the spectrum showed three prominent peaks representing contributions of the nearest coordination protective shells of neighbors of the V atom. As to the $V_2O_3$ comparative material, which has a trigonal crystal structure, the spectrum also showed three prominent peaks representing contributions of the nearest coordination protective shells of neighbors of the V. The spectrum of the composite material was more similar to the spectrum of the $V_2O_3$ comparative material than to the either spectrum of the other comparative materials. Strong peaks characteristic of more distant protective shells were absent in both the spectrum for the composite material and the spectrum for the $V_2O_3$ comparative material. It is believed that the results demonstrate that the V of the composite material is predominantly in the form of crystalline $V_2O_3$.

Each of the V K-edge EXAFS spectra associated with the composite material and the $V_2O_3$ comparative material were processed in a similar manner to that described above in connection with Example 11. For each of the composite material and the $V_2O_3$ comparative material, Fourier transformation of $k^3\Omega(k)$ over the limited k-space range of between 3.95 Å$^{-1}$ and 12.55 Å$^{-1}$ was performed to provide the corresponding radial structure function (FT magnitude) as a function of the interatomic distance, R (Å), as graphically shown in FIG. 10 (where Composite Material III and the $V_2O_3$ comparative material are shown as "III" and "CM", respectively). A graphical representation of theoretical results of an FEFF fit analysis of the composite material and the $V_2O_3$ comparative material is also shown in FIG. 10 (where the fit for Composite Material III and the fit for the $V_2O_3$ comparative material are shown as "III fit" and "CM fit", respectively).

An FEFF fit analysis was carried out for the composite material and the $V_2O_3$ comparative material, resulting in the structural parameters set forth in Table 9 below, wherein $Z_a$-$Z_b$ represents the central absorber and the scattering atom (or path) correlation, CN is the coordination number, R is the interatomic distance, $\sigma^2$ represents the Debye-Waller disorder parameter, and the reduction factor is 6/5.0315.

TABLE 9

FEFF Fit Analysis Data for Composite Material and Comparative Material

| Material | $Z_a$-$Z_b$ | CN | R(Å) | $\Sigma^2(\text{Å}^2 10^{-2})$ |
|---|---|---|---|---|
| Composite Material III | V—O | 3.7039 | 1.9996 | 2.264 |
| Comparative Material $V_2O_3$ | V—O | 2.2902 | 1.9681 | 5.449 |

A good fit between the EXAFS spectra of the composite material and the comparative material was obtained in the k-space range of between 3.95 Å$^{-1}$ and 12.55 Å$^{-1}$ at a R in the region of around 2 Å, particularly around 1.99 Å, as shown in FIG. 10. A good fit between the FEFF fit analysis data for the composite material and the comparative material was obtained, the former showing six oxygen atoms at a distance of 1.9996 Å, as shown in Table 9.

It is believed that the results of this example are consistent with the conclusion that the central V of the composite material is closer to an ideal octahedral $VO_6$ structure than is the central V of the comparative material.

Example 13

Structural Analyses of Composite Material and Comparative Materials

Composite Material II and two comparative materials, rutile $TiO_2$ and anatase $TiO_2$, were analyzed using Ti K-edge Extended X-ray Absorption Fine Structure (EXAFS). Resulting spectra (absorption (a.u.) vs. energy (eV), not shown) for Composite Material II showed peaks in a range of from about 4950 eV to about 5100 eV, which was similar to the range associated with rutile $TiO_2$.

Example 14

Structural Analyses of Composite Material and Comparative Material

Generally, vibrational modes that are attributed to the motion of cations relative to neighboring oxygen atoms are sensitive to the point group symmetry of the cations in the oxygen host matrix. The local environment of the cations in a lattice of close-packed oxygen atoms can be studied using Fourier transform infrared (FTIR) spectroscopy.

Figure 11A:
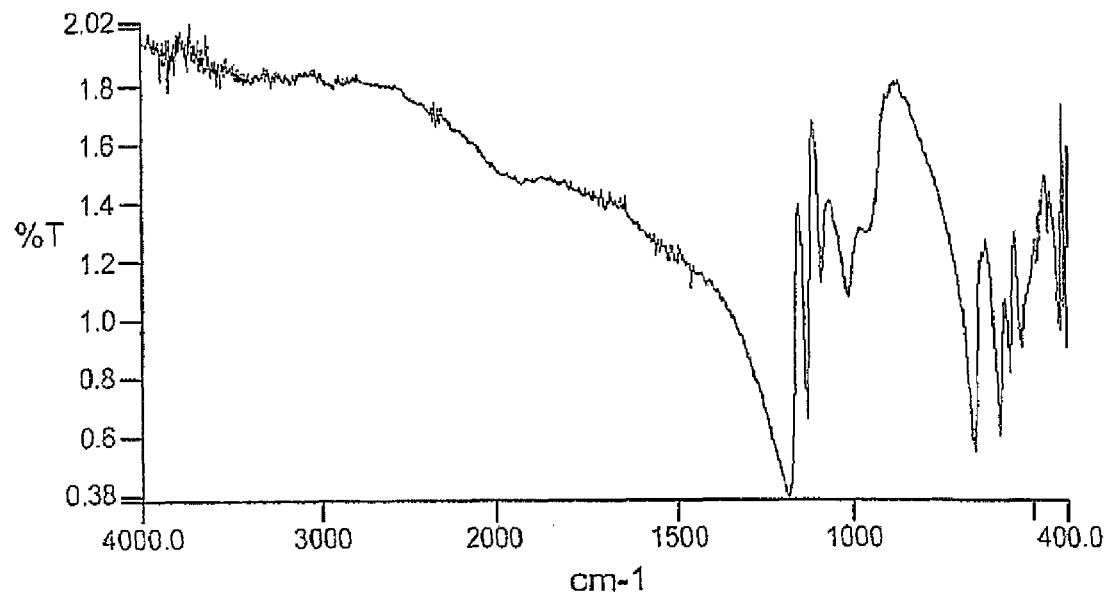
FIG. 11A is a graphical representation of Fourier transform infrared spectra (transmission (%) vs. frequency ($cm^{-1}$)) obtained in connection with a composite material in a particular frequency range, and FIG. 11B a graphical representation of Fourier transform infrared spectra (transmission (%) vs. frequency ($cm^{-1}$)) obtained in connection with a composite material and a comparative material in a particular frequency range, as further described in Example 14.
Figure 11B:
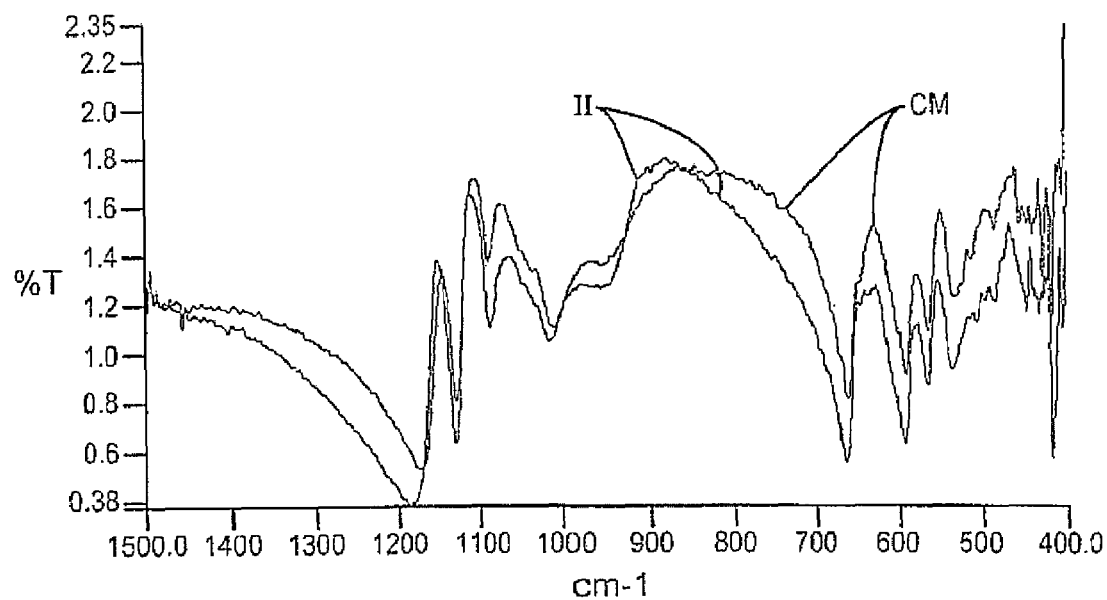

Composite Material II and a comparative material, $LiFePO_4/C$, were analyzed using FTIR spectroscopy at room temperature. The resulting spectra (T (%) vs. frequency (cm$^{-1}$)) for the composite material in a frequency range of from 400 cm$^{-1}$ to 4000 cm$^{-1}$ is shown in FIG. 11A. The resulting spectra (T (%) vs. frequency (cm$^{-1}$)) for the composite material and the comparative material in a frequency range of from 400 cm$^{-1}$ to 1500 cm$^{-1}$ are shown in FIG. 11B (where Composite Material II and the comparative material are shown as "II" and "CM", respectively).

For inorganic oxides, the resonant frequencies of the cations in octahedral interstices (such as the alkali metal cations in $LiO_6$, for example) are located in a frequency range of from 200 cm$^{-1}$ to 400 cm$^{-1}$. For orthophosphates, the resonant frequencies of the cations are located in two main frequency ranges of from 520 cm$^{-1}$ to 580 cm$^{-1}$ and from 1000 cm$^{-1}$ to 1060 cm$^{-1}$, respectively. The spectrum for the composite material shows five peaks in a frequency range of from 800 cm$^{-1}$ to 1200 cm$^{-1}$, which is believed to confirm the presence of the $PO_4$ anion. This spectrum shows no obvious absorption peak in a frequency range of from 2500 cm$^{-1}$ to 3500 cm$^{-1}$, which is believed to confirm that no $Fe(OH)_2$ exists in the composite material. It is believed that the peak at about 547 cm$^{-1}$ and the peak at about 638 cm$^{-1}$ are attributable to stretching vibrations of a P—O—P group with different bond lengths and that the peak at about 966 cm$^{-1}$ is attributable to P—O—P bending modes. Further, it is believed that the peak at about 463 cm$^{-1}$ is attributable to bending harmonics of O—P—O and O=P—O groups and the peak at about 1043 cm$^{-1}$ is attributable to metal —$(PO_4)^3$ link vibration. It is believed that the spectra shown in FIG. 11B shows a significant displacement of the signal peak positions for the composite material relative to those for the comparative material, which is indicative of a difference in the structures of these different materials.

Example 15

Electrochemical Reversible Half-Cells Comprising Composite Materials and Performance Thereof Coin-type electrochemical reversible half-cells were prepared in a manner similar to that described in connection with Example 8 using various different composite materials, namely, $LiFePO_4$ $TiO_2/C$, $LiFePO_4.V_2O_3/C$, $LiFePO_4.MnO/C$, $LiFePO_4.CoO/C$, $LiFePO_4.NiO/C$, $LiFePO_4$ Cu/C, $LiFePO_4$ ZnO/C, $LiFePO_4$ MgO/C, $LiFePO_4.Al_2O_3/C$, and $LiFePO_4$—$SiO_2/C$, and using a comparative material, native $LiFePO_4/C$. Each of the coin-type electrochemical reversible half-cells described above was tested to determine associated charge and discharge characteristics over several charge-discharge cycles at room temperature. The following parameters were used: an applied charge voltage and an applied discharge voltage, each in the range from 2.5 V to 4.3 V; a charge rate and discharge rate, each set to C/5; and room temperature conditions. Charge capacity (mAh/g) and discharge capacity (mAh/g) associated with a first charge-discharge cycle at the current density of 0.2 C were determined.

Figure 12:
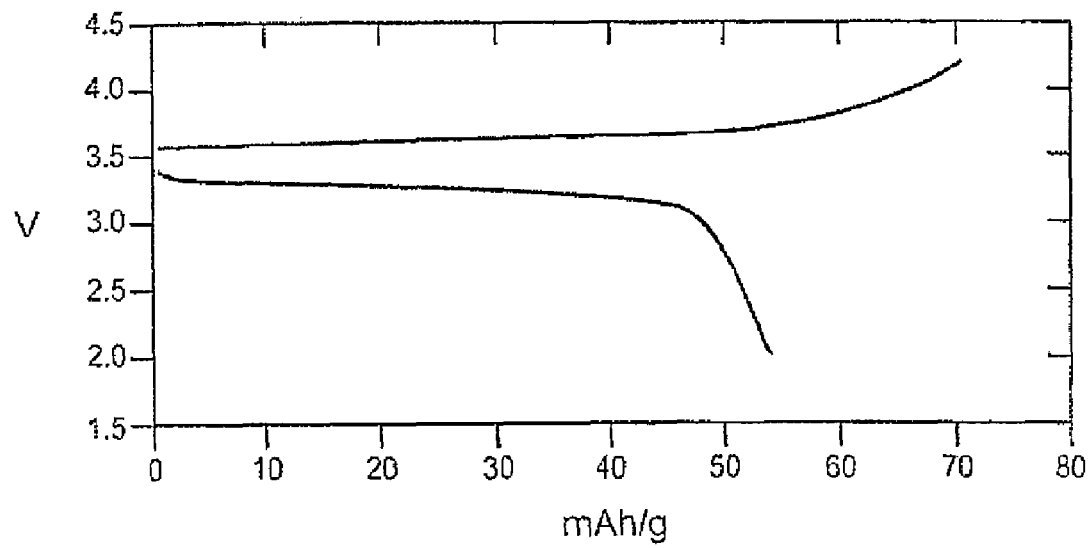
FIG. 12 is a graphical representation of charge and discharge results (potential (V) vs. capacity (mAh/g)) obtained in connection with a half-cell comprising a comparative material, as further described in Example 15.
Figure 13:
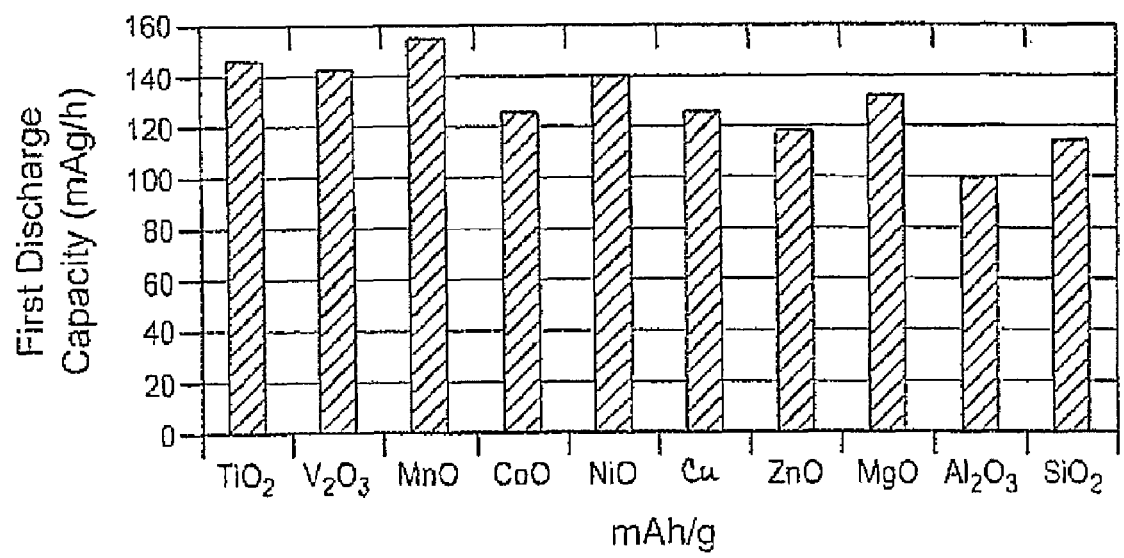
FIG. 13 is a graphical representation of the first discharge capacity (LAh/g) obtained in connection with each of several half-cells comprising different composite materials, as further described in Example 15.

The results (potential (V) vs. capacity (mAh/g)) obtained for the half-cell comprising the comparative material are graphically shown in FIG. 12, the first charge capacity being about 70 mAh/g and the first discharge capacity being about 55 mAh/g. The first discharge capacity (mAh/g) obtained for the half-cell comprising each of the composite materials are graphically shown in FIG. 13, in which each composite material is identified simply by its oxide component the first discharge capacity being anywhere from about 100 mAh/g (for $LiFePO_4.Al_2O_3/C$) to about 145 mAh/g (for $LiFePO_4.TiO_2/C$) or about 155 mAh/g (for $LiFePO_4.MnO/C$). It is believed that each of the composite materials is characterized by a crystal unit that differs from that of the comparative material and by a conductivity that is greater than that of the comparative material, such that movement of lithium ions and electron-transferring processes associated with each of the composite materials are faster than those associated with the comparative material. It is believed that such differences result in a discharge capacity associated with each of the composite materials that is larger than that associated with the comparative material. It is believed that such differences would give similar results when higher charge and discharge rates are employed.

Each of the half-cells comprising a composite material (sometimes referred to as a composite material half-cell) and the half-cell comprising the comparative cell (sometimes referred to as a comparative material half-cell) underwent galvanostatic charging and discharging at a rate of C/5. Although the polarization of the half-cells was small, suggesting that the observed voltages were close to equilibrium values, sloping voltage curves at low and high rates of charge in galvanostatic measurements are commonly attributed to kinetic limitations. The galvanostatic measurements herein were used in an effort to provide definitive information as to the extent of equilibrium nonstoichiometry.

Figure 14:
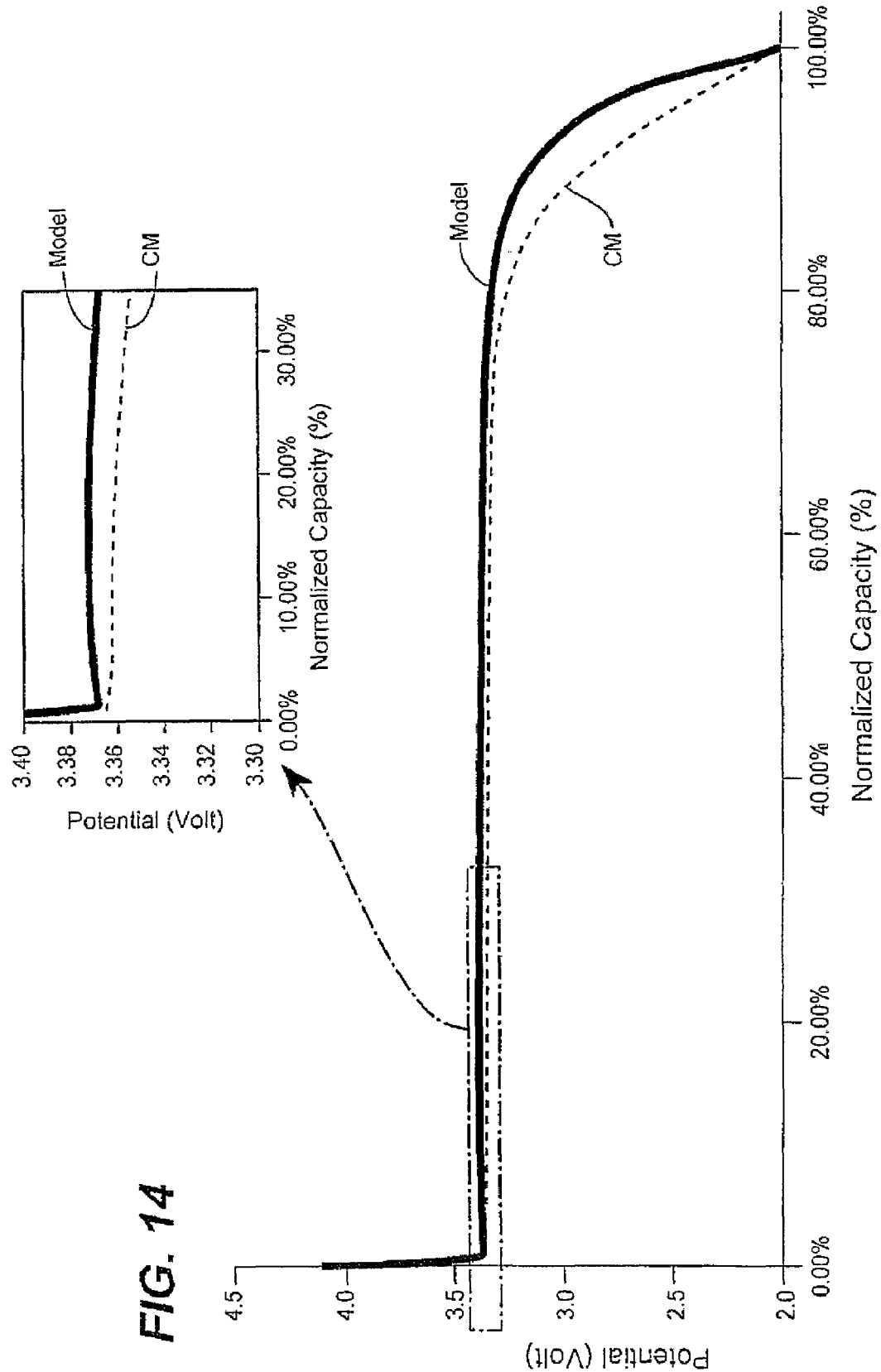
FIG. 14 is a graphical representation of discharging results potential (V) vs. normalized capacity (%)) obtained in connection with a half-cell comprising a model composite material and a half-cell comprising a comparative material, an enlarged portion of which appears in an inset, as further described in Example 15.
Figure 15:
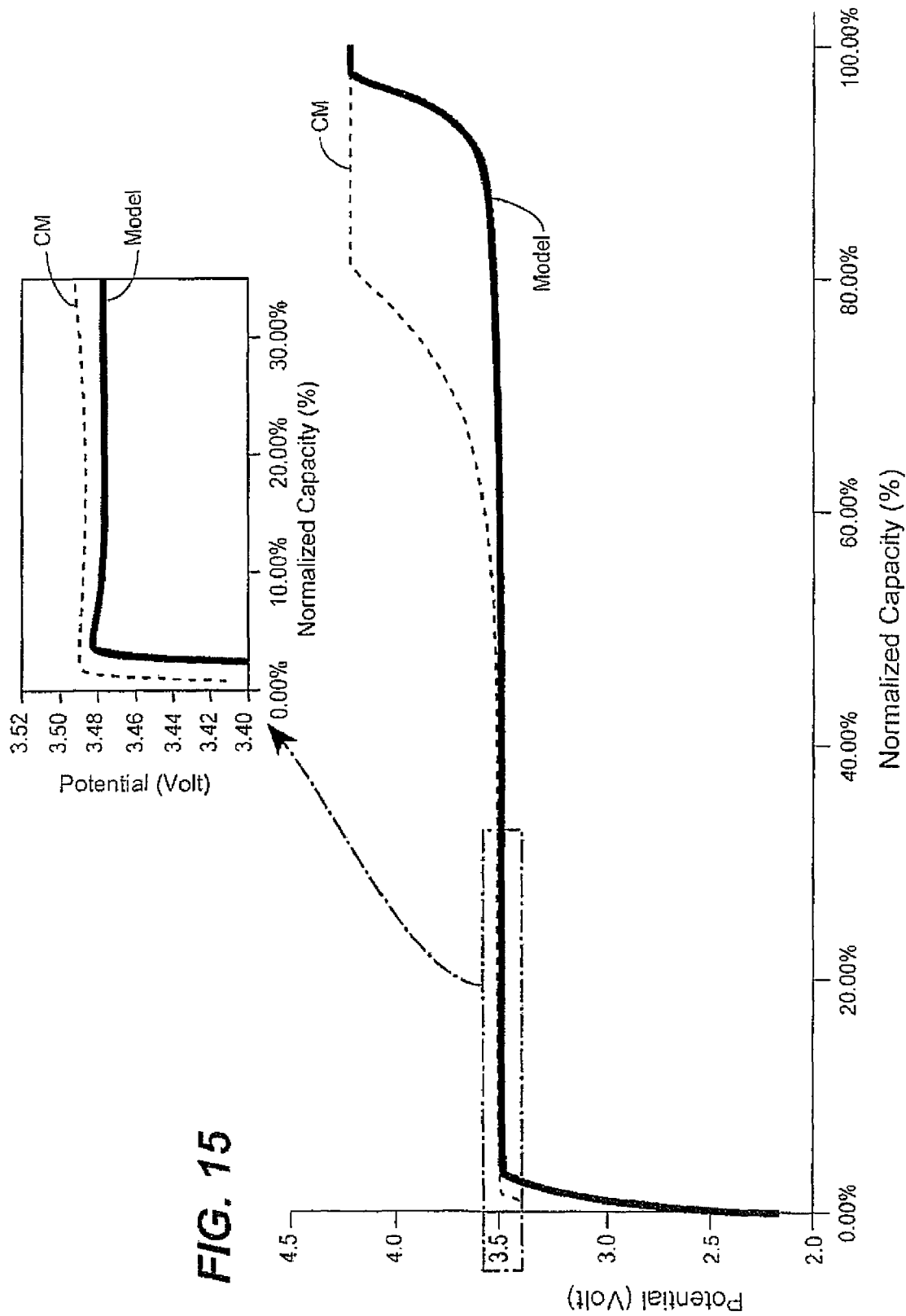
FIG. 15 is a graphical representation of charging results (potential (V) vs. normalized capacity (%)) obtained in connection with a half-cell comprising a model composite material and a half-cell comprising a comparative material, an enlarged portion of which appears in an inset, as further described in Example 15.

The results (potential (V) vs. normalized capacity (%)) of the galvanostatic charging and discharging of a "model" composite material half-cell and a comparative material half-cell are graphically shown in FIG. 14 (discharging) and FIG. 15 (charging) (where the "model" composite material and the comparative material are shown as "Model" and "CM", respectively). Here, the results for the "model" composite material half-cell are based on an average of the results for each of the composite material half-cells listed above. The voltage associated with the plateau of the discharge curve is slightly higher for the model composite material half-cell than for the comparative material half-cell, and the voltage associated with the plateau of the charge curve is slightly lower for the model composite material half-cell than for the comparative material half-cell. The plateau of the discharge curve for the model composite material half-cell shows a rising phenomena, while the plateau of the discharge curve for the comparative material half-cell does not, as can be seen in the inset of FIG. 14. The plateau of the charge curve for the model composite material half-cell shows a dropping phenomean, while the plateau of the charge curve for the comparative material half-cell does not, as can be seen in the inset of FIG. 15. It is believed that these relative differences are attributable not to polarization differences between the two types of cells, but to thermodynamic differences between the two types of cells, these latter differences reflected by an open-circuit voltage (OCV) associated with the model composite material half-cell that was about 0.01 V higher than an OCV associated with the comparative material half-cell.

The more or less constant voltage plateaus of the discharge and charge curves associated with the model composite material half-cell are broader than those for the comparative material half-cell. It is believed that the greater relative breadth of these plateaus for the model composite material half-cell indicate cocrystallization in the material used in the half-cell. The breadth of these plateaus suggests the breadth of composition ranges associated with such cocrystallization. It is believed that this suggests that for the model composite material half-cell, there is a broad composition range associated cocrystallization in the composite material of the half-cell.

It is believed that the results of this Example are consistent with the conclusion that a higher C rate may be used in the discharging of a composite material half-cell than in the discharging of a comparative material half-cell, a higher voltage or power exhibiting a rising phenomena may be discharged from a composite material half-cell than from a comparative material half-cell, and that a lower voltage or power exhibiting a dropping phenomena may be used in the charging of a composite material half-cell than in the charging of a comparative material half-cell. It is believed these differences are attributable to the electrochemical behavior of cocrystalline units of the composite material used in the half-cell.

Example 16

Electron Conductivity Comprising Composite Materials and Performance Thereof

Samples of cocrystalline composite materials were prepared in a manner similar to that described herein, including calcination at 800° C. The room temperature electron conductivity (in siemens (S) per centimeter (cm)) of such cocrystalline material samples, namely, $LiFePO_4 \cdot 0.013TiO_2$, $LiFePO_4 \cdot 0.098V_2O_3$, $LiFePO_4 \cdot 0.012Cr_2O_3$, and $LiFePO_4 \cdot 0.098Cu$, were determined to be $4.5 \times 10^{-2}$ $Scm^{-1}$, $2.6 \times 10^{-3}$ $Scm^{-1}$, $3.3 \times 10^{-2}$ $Scm^{-1}$, and $6.5 \times 10^{-3}$ $Scm^{-1}$, respectively, by the Industrial Technology Research Institute (ITRI), a governmental research institute in Taiwan. It is believed that relative to the room temperature electron conductivity of $LiFePO_4$, namely, about $10^{-10}$ to $10^{-9}$ $Scm^{-1}$, the lattice electron conductivity of the cocrystalline composite materials may be increased by a factor of $10^8$ or more, reaching room temperature electron conductivity values of up to at least more than about $10^{-2}$ $Scm^{-1}$.

It is believed that such composite materials described herein have enhanced properties, such as ion diffusibility, electron conductivity, charge and discharge characteristics, and/or lattice stability, for example, relative to comparative materials, such as $LiFePO_4$. The composite materials described herein are believed to be particularly useful in electrochemical applications. For example, an electrochemical cell, sensor or battery, such as a rechargeable lithium battery, for example, comprising an electrode made of such a composite material may provide good charge/discharge capacity, good charge/discharge capacity retention, and/or good charge/discharge rate capability.

Various modifications, processes, as well as numerous structures that may be applicable herein will be apparent. Various aspects, features or embodiments may have been explained or described in relation to understandings, beliefs, theories, underlying assumptions, and/or working or prophetic examples, although it will be understood that any particular understanding, belief, theory, underlying assumption, and/or working or prophetic example is not limiting. Although the various aspects and features may have been described with respect to various embodiments and specific examples herein, it will be understood that any of same is not limiting with respect to the full scope of the appended claims or other claims that may be associated with this application.

The invention claimed is:

1. A composition for use in an electrochemical redox reaction, comprising:
a material represented by a general formula $M_yXO_4$, wherein M represents at least one element selected from the group consisting of transition metal elements, zinc, cadmium, beryllium, magnesium, calcium, strontium, boron, aluminum, silicon, gallium, germanium, indium, tin, antimony, and bismuth; X represents at least one element selected from the group consisting of phosphorus, arsenic, silicon and sulfur; O represents oxygen; and y represents a number from about 0.8 to about 1.2 inclusive;
wherein the material is capable of being intercalated with ionic A to form $A_xM_yXO_4$, wherein A represents at least one element selected from the group consisting of alkali metal elements, beryllium, magnesium, cadmium, boron, and aluminum; and x represents a number from about 0.8 to about 1.2 inclusive; and
an oxide component comprising an oxide of at least one element selected from the group consisting of beryllium, magnesium, calcium, strontium, boron, aluminum, silicon, gallium, germanium, indium, tin, antimony, bismuth, and Groups 3-10 and 12;
wherein the material and the oxide component are cocrystalline.

2. A composition for use in an electrochemical redox reaction, comprising:
a material represented by a general formula $A_xM_yXO_4$, wherein A represents at least one element selected from the group consisting of alkali metal elements, beryllium, magnesium, cadmium, boron, and aluminum; M represents at least one element selected from the group consisting of transition metal elements, zinc, cadmium, beryllium, magnesium, calcium, strontium, boron, aluminum, silicon, gallium, germanium, indium, tin, antimony, and bismuth; X represents at least one element selected from the group consisting of phosphorus, arsenic, silicon and sulfur; O represents oxygen; x represents a number from about 0.8 to about 1.2 inclusive; y represents a number from about 0.8 to about 1.2 inclusive; and
an oxide component comprising an oxide of at least one element selected from the group consisting of beryllium, magnesium, calcium, strontium, boron, aluminum, silicon, gallium, germanium, indium, tin, antimony, bismuth, and Groups 3-10 and 12;
wherein the material and the oxide component are cocrystalline.

3. The composition of claim 1 or claim 2, wherein A represents at least one element selected from the group consisting of lithium, sodium, and potassium.

4. The composition of claim 1 or claim 2, wherein M represents at least one element selected from the group consisting of first row transition metal elements.

5. The composition of claim 1 or claim 2, wherein X represents at least one element selected from the group consisting of phosphorus and arsenic.

6. The composition of claim 1 or claim 2, wherein the oxide is an oxide of at least one element selected from the group consisting of first row transition metal elements, zinc, magnesium, aluminum, and silicon.

7. The composition of claim 1 or claim 2, wherein the oxide component is present in an amount of less than or equal to a mole ratio of about 0.1 relative to the composition.

8. The composition of claim 1 or claim 2, wherein in the general formula A represents at least one element selected from the group consisting of alkali metal elements; M represents at least one element selected from the group consisting of transition metal elements; and X represents at least one element selected from the group consisting of phosphorus and arsenic.

9. The composition of claim 1 or claim 2, further comprising carbon.

10. The composition of claim 1 or claim 2, wherein an amount of the oxide component and the material form a cocrystalline portion and an additional amount of the oxide component forms an outer portion that at least partially surrounds the cocrystalline portion.

11. The composition of claim 1 or claim 2, further comprising carbon, wherein an amount of the oxide component and the material form a cocrystalline portion, an additional amount of the oxide component forms an outer portion that at least partially surrounds the cocrystalline portion, and the carbon at least partially surrounds the outer portion.

12. The composition of claim 1 or claim 2, wherein the composition is nanoscale.

13. The composition of claim 1 or claim 2, wherein A represents at least one element selected from the group consisting of lithium and sodium; M represents at least one element M1 selected from the group consisting of manganese, iron, cobalt, and nickel, and at least one element M2 selected from the group consisting of titanium, vanadium, chromium, manganese, iron, cobalt, nickel, copper, zinc, magnesium, aluminum, silicon, gold, antimony, and lanthanum, wherein M1 and M2 are not the same; X represents phosphorus; O represents oxygen; the oxide is an oxide of at least one element selected from the group consisting of titanium, vanadium, chromium, manganese, iron, cobalt, nickel, zinc, magnesium, aluminum, silicon, antimony, and lanthanum.

14. The composition of claim 1, wherein the material and the oxide component in a cocrystalline form are represented by the formula $M_yXO_4 \cdot zB$, wherein the B represents the oxide component and z is less than or equal to about 0.1.

15. The composition of claim 2, wherein the material and the oxide component in a cocrystalline form are represented by the formula $A_xM_yXO_4 \cdot zB$, wherein the B represents the oxide component and z is less than or equal to about 0.1.

16. An electrode comprising the composition of claim 1 or claim 2.

17. An electrochemical cell comprising an electrode of claim 16.

18. A process of preparing a composition for use in an electrochemical redox reaction, comprising:
combining a first material comprising M, wherein M represents at least one element selected from the group consisting of transition metal elements, zinc, cadmium, beryllium, magnesium, calcium, strontium, boron, aluminum, silicon, gallium, germanium, indium, tin, antimony, and bismuth, and a solution comprising a second material comprising X, wherein X represents at least one element selected from the group consisting of phosphorus, arsenic, silicon, and sulfur and the second material correspondingly comprises at least one material selected from the group consisting of phosphate, arsenate, silicate, and sulfate, to produce a resulting solution;
obtaining a particle mixture from the resulting solution;
milling the particle mixture with an oxide component comprising an oxide of at least one element selected from the group consisting of magnesium, aluminum, silicon, and Groups 3-10 and 12, to produce a semicrystalline particle mixture;
drying the semicrystalline particle mixture to provide a precursor; and
calcining the precursor to produce a composition comprising the oxide component and a material represented by a general formula $M_yXO_4$, wherein O represents oxygen, and y represents a number from about 0.8 to about 1.2 inclusive, the composition capable of being intercalated with ionic A to form $A_xM_yXO_4$, wherein A represents at least one element selected from the group consisting of alkali metal elements, beryllium, magnesium, cadmium, boron, and aluminum; and x represents a number from about 0.8 to about 1.2 inclusive, wherein the material and the oxide component are cocrystalline.

19. A process of preparing a composition for use in an electrochemical redox reaction, comprising:
combining a first material comprising M, wherein M represents at least one element selected from the group consisting of transition metal elements, zinc, cadmium, beryllium, magnesium, calcium, strontium, boron, aluminum, silicon, gallium, germanium, indium, tin, antimony, and bismuth; a solution comprising a second material comprising X, wherein X represents at least one element selected from the group consisting of phosphorus, arsenic, silicon, and sulfur and the second material correspondingly comprises at least one material selected from the group consisting of phosphate, arsenate, silicate, and sulfate; and a third material comprising ionic A, wherein A represents at least one element selected from the group consisting of alkali metal elements, beryllium, magnesium, cadmium, boron, and aluminum, to produce a resulting solution;
obtaining a particle mixture from the resulting solution;
milling the particle mixture with an oxide component comprising an oxide of at least one element selected from the group consisting of magnesium, aluminum, silicon, and Groups 3-10 and 12, to produce a semicrystalline particle mixture;
drying the semicrystalline particle mixture to provide a precursor; and
calcining the precursor to produce a composition comprising the oxide component and a material represented by a general formula $A_xM_yXO_4$, wherein O represents oxygen, x represents a number from about 0.8 to about 1.2 inclusive, and y represents a number from about 0.8 to about 1.2 inclusive,
wherein the material and the oxide component are cocrystalline.

20. The process of claim 18 or claim 19, wherein at least one of said combining and said obtaining further comprises adjusting pH.

21. The process of claim 19, wherein said combining comprises first combining the first material and the solution to produce a first solution and then combining the first solution and the third material.

22. The process of claim 18 or claim 19, wherein said milling is sufficient to produce a semicrystalline nanoscale particle mixture.

23. The process of claim 18 or claim 19, wherein calcining the precursor comprises calcining the precursor in the presence of an inert gas and carbon particles suspended in the inert gas.

24. The process of claim 18 or claim 19, further comprising adding a reducing agent.

25. The process of claim 18 or claim 19, wherein A represents at least one element selected from the group consisting of lithium, sodium, and potassium.

26. The process of claim 18 or claim 19, wherein M represents at least one element selected from the group consisting of first row transition metal elements.

27. The process of claim 18 or claim 19, wherein the oxide is an oxide of at least one element selected from the group consisting of first row transition metal elements and magnesium.

28. The process of claim 18 or claim 19, wherein the composition is nanoscale.

* * * * *